(12) United States Patent
Rosenberg et al.

(10) Patent No.: US 12,675,213 B2
(45) Date of Patent: Jul. 7, 2026

(54) SYSTEMS AND METHODS FOR VISION ASSISTANCE

(71) Applicant: ReBokeh Vision Technologies Inc., Towson, MD (US)

(72) Inventors: Rebecca Rosenberg, Toms River, NJ (US); Jacob Mendelowitz, Cambridge, MA (US)

(73) Assignee: Rebokeh Vision Technologies Inc., Towson, MD (US)

( * ) Notice: Subject to any disclaimer, the term of this patent is extended or adjusted under 35 U.S.C. 154(b) by 120 days.

(21) Appl. No.: 18/471,567

(22) Filed: Sep. 21, 2023

(65) Prior Publication Data
US 2024/0104706 A1 Mar. 28, 2024

Related U.S. Application Data

(60) Provisional application No. 63/376,737, filed on Sep. 22, 2022.

(51) Int. Cl.
| | |
|---|---|
| *G06T 5/90* | (2024.01) |
| *G06F 3/04845* | (2022.01) |
| *G06F 3/04847* | (2022.01) |
| *G06F 3/0488* | (2022.01) |
| *G06T 5/92* | (2024.01) |
| *H04N 23/69* | (2023.01) |

(52) U.S. Cl.
CPC ...... *G06F 3/04847* (2013.01); *G06F 3/04845* (2013.01); *G06F 3/0488* (2013.01); *G06T 5/90* (2024.01); *G06T 5/92* (2024.01); *H04N 23/69* (2023.01); *G06T 2200/24* (2013.01); *G06T 2207/20081* (2013.01)

(58) Field of Classification Search
CPC ............ G06F 3/04847; G06F 3/04845; G06F 3/0488; G06F 2203/04806; G06F 3/0481; G06F 3/0485; G06F 3/04883; G06T 5/90; G06T 5/92; G06T 2200/24; G06T 2207/20081; G06T 2207/20084; H04N 23/69; H04N 23/64
See application file for complete search history.

(56) References Cited

U.S. PATENT DOCUMENTS

| | | | | |
|---|---|---|---|---|
| 2004/0252132 A1* | 12/2004 | Vuylsteke | ................. | G06T 5/40 345/617 |
| 2005/0264833 A1* | 12/2005 | Hiraoka | ................. | H04N 1/622 358/1.9 |
| 2013/0326583 A1 | 12/2013 | Freihold et al. | | |

(Continued)

*Primary Examiner* — MeKonnen D Dagnew
(74) *Attorney, Agent, or Firm* — Scale LLP

(57) ABSTRACT

Disclosed are methods, systems and non-transitory computer readable memory for dynamic image adjustment and augmentation for enhancement of viewability. For instance, a method may include obtaining, from a camera system, at least one image of a visual environment or situation, wherein a first image of the at least one image includes a first set of pixels; implementing, in accordance with an adjustment layer, one or more image adjustments to the first set of pixels to obtain an augmented set of pixels, wherein the adjustment layer is determined (a) through a user interface by user interactions from a user and/or (b) a recommendation of a machine learning model; and presenting, on at least one display, the augmented set of pixels to the user.

13 Claims, 19 Drawing Sheets

(56)     References Cited

U.S. PATENT DOCUMENTS

| | | | |
|---|---|---|---|
| 2014/0313363 A1* | 10/2014 | Chiu | G06F 3/048 |
| | | | 348/222.1 |
| 2016/0292836 A1* | 10/2016 | Perry | G06T 5/60 |
| 2017/0061635 A1 | 3/2017 | Oberheu et al. | |
| 2017/0220126 A1 | 8/2017 | Holz | |
| 2019/0156526 A1 | 5/2019 | Liu et al. | |
| 2019/0354817 A1* | 11/2019 | Shlens | G06T 3/60 |
| 2020/0149916 A1* | 5/2020 | Yu | G01C 21/3415 |
| 2020/0302656 A1* | 9/2020 | Kumar | G06T 7/90 |
| 2021/0397899 A1* | 12/2021 | Watanabe | G06N 3/045 |
| 2022/0237410 A1* | 7/2022 | Wrenninge | G06V 20/56 |

* cited by examiner

Common widget 310

Position property 320

Origin property 325

Gravity property 330

1st Control 335A

2nd Control 335B

Nth Control 335N

300 FIG. 3

Gesture widget 410

Position property 420

Origin property 425

Text size property 430

Overlay color property 435

1st Control 440

2nd Control 445

Nth Control 445

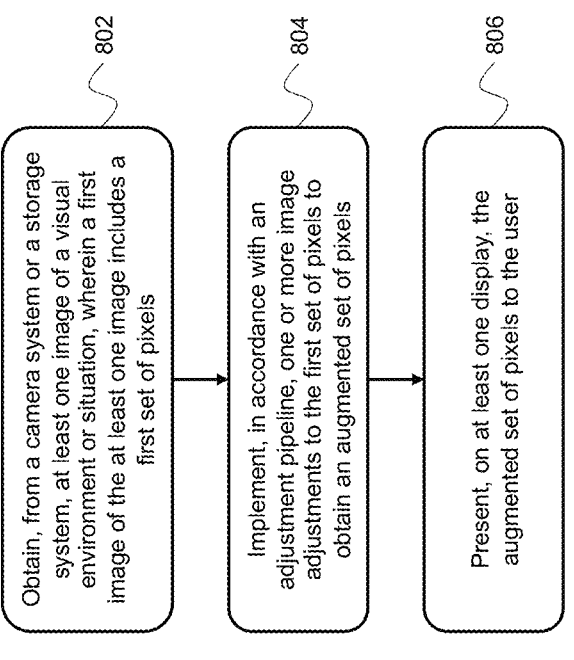

Obtain, from a camera system or a storage system, at least one image of a visual environment or situation, wherein a first image of the at least one image includes a first set of pixels

802

Implement, in accordance with an adjustment pipeline, one or more image adjustments to the first set of pixels to obtain an augmented set of pixels

804

Present, on at least one display, the augmented set of pixels to the user

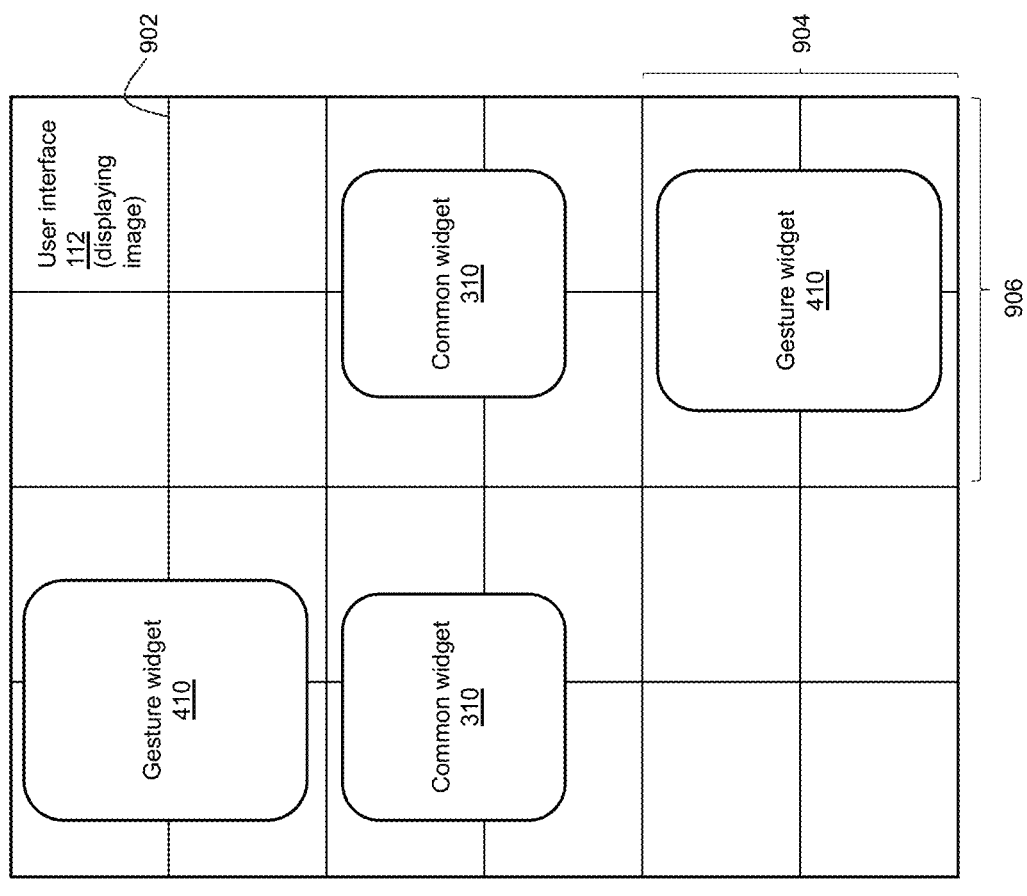
900A FIG. 9A

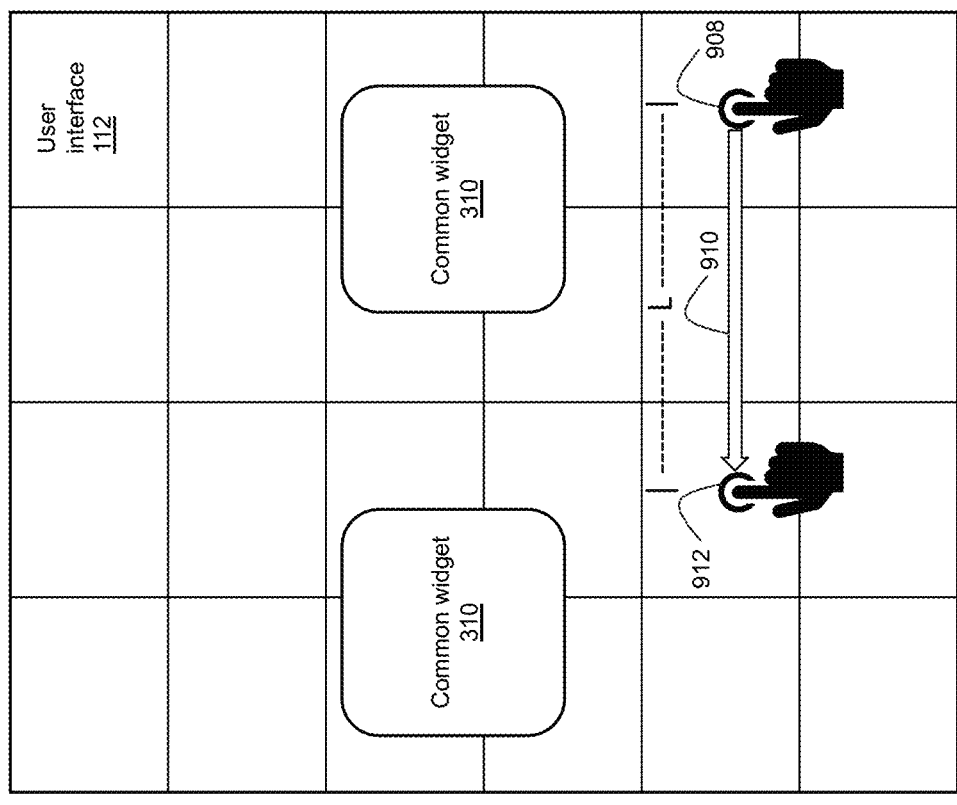
900B FIG. 9B

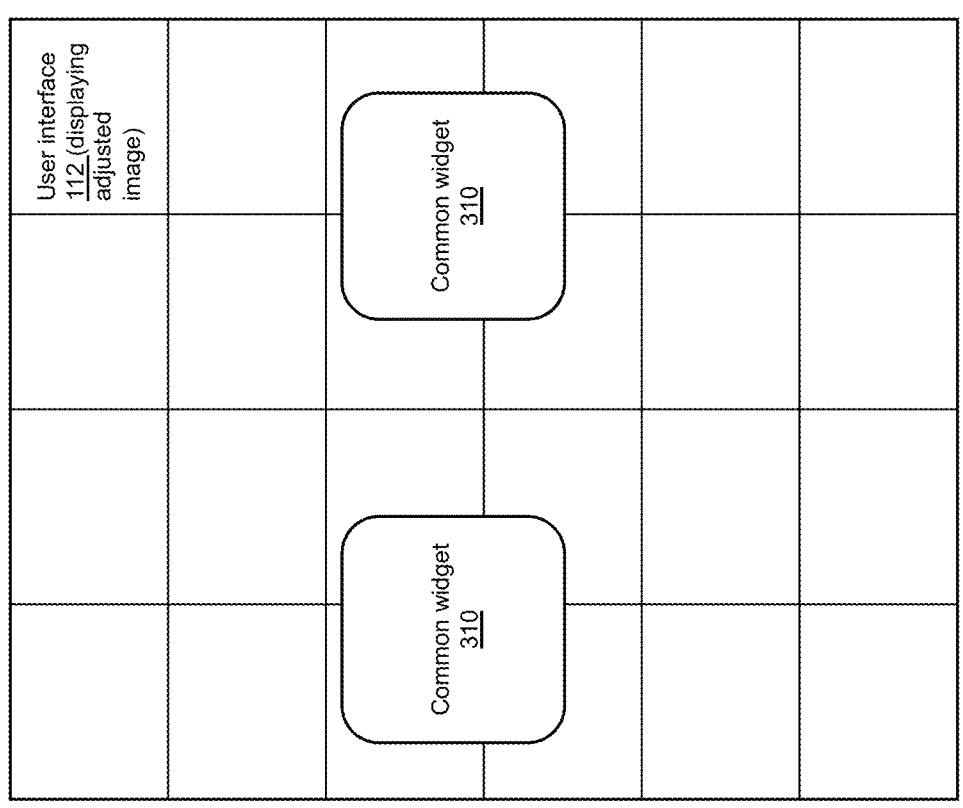
900C FIG. 9C

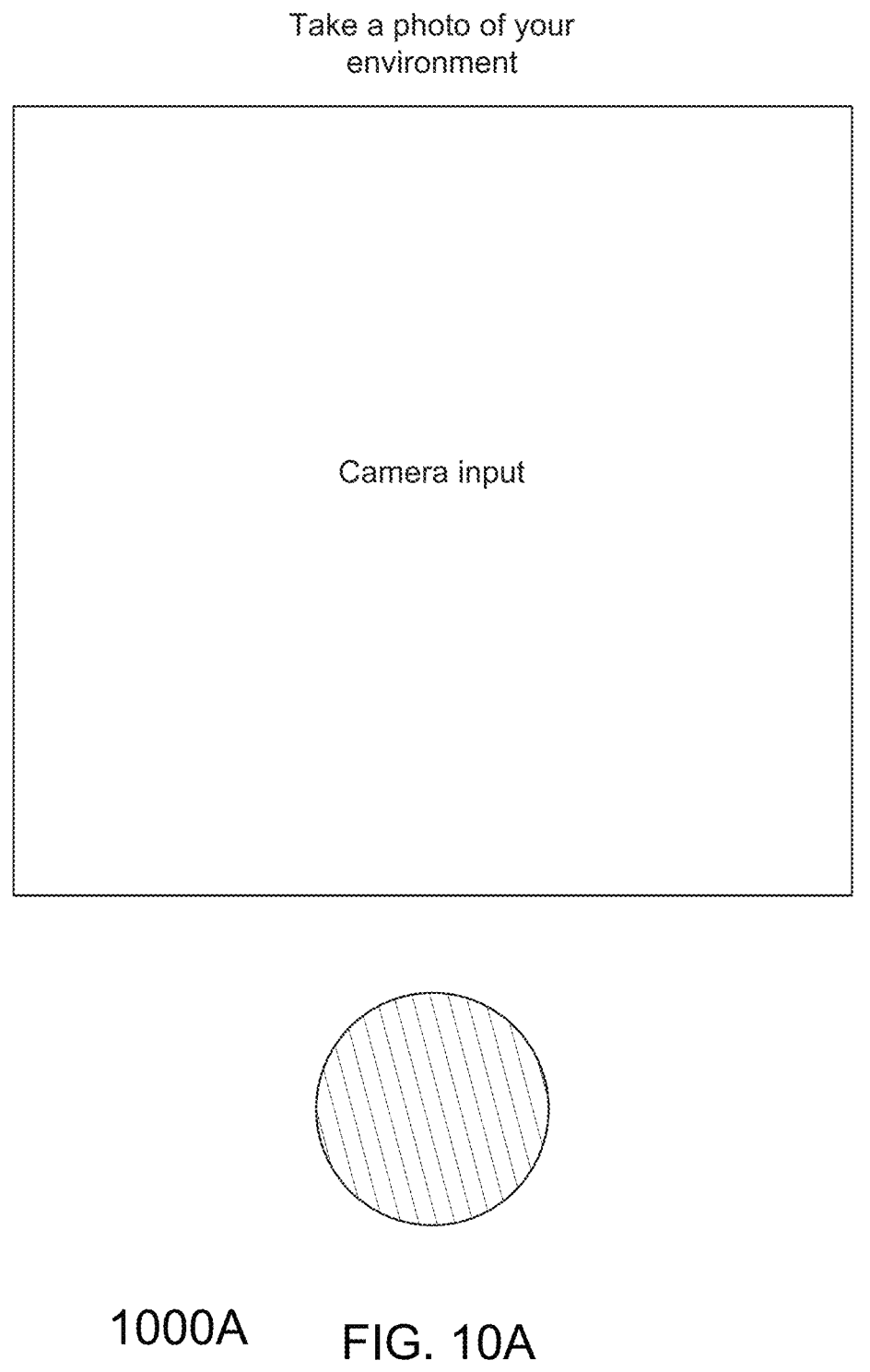

Take a photo of your
environment

Camera input

1000A          FIG. 10A

Take a photo of your
environment
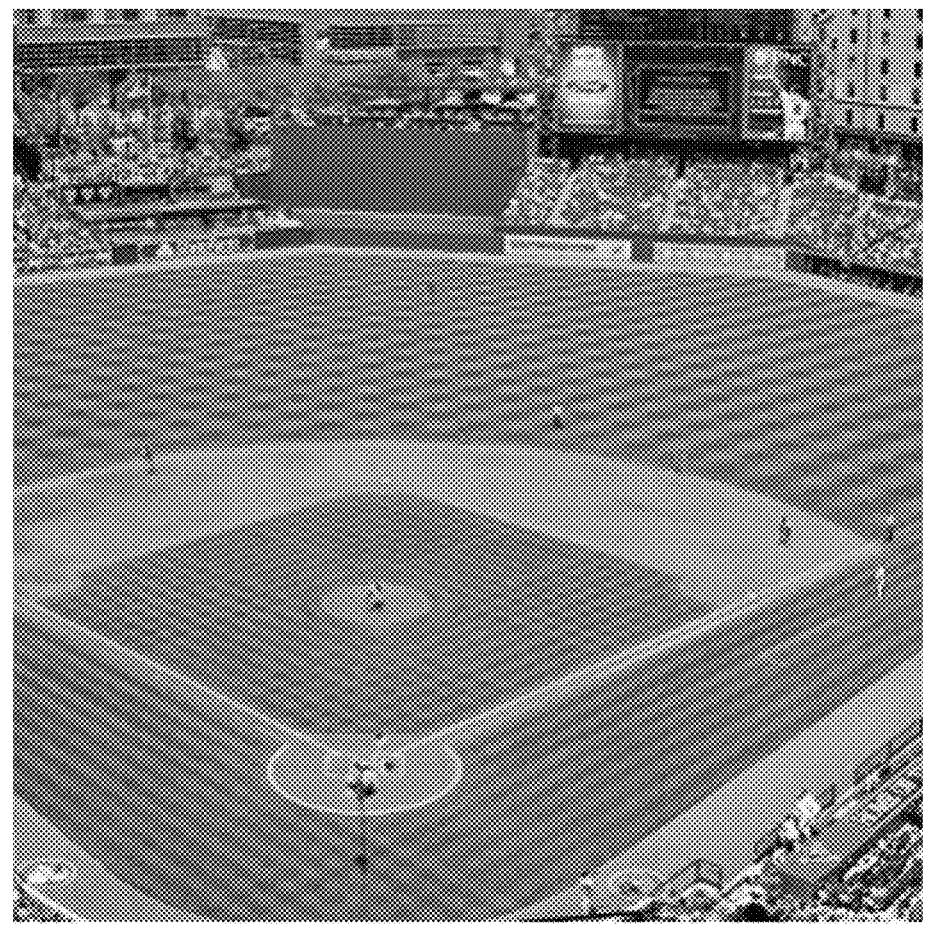
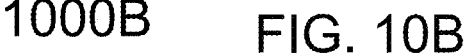
1000B    FIG. 10B

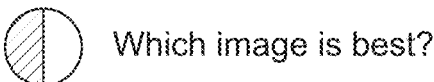 Which image is best?
 High contrast
 Medium contrast
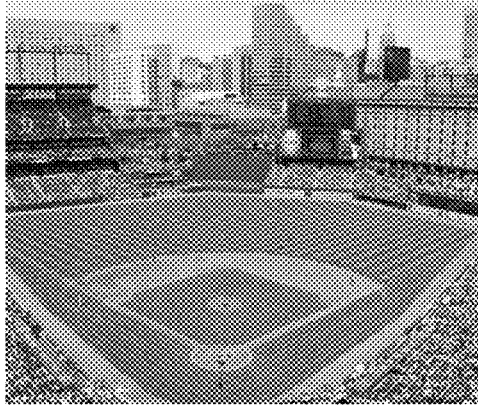 No change
1000C
FIG. 10C

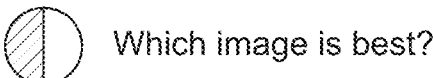
Which image is best?
High contrast
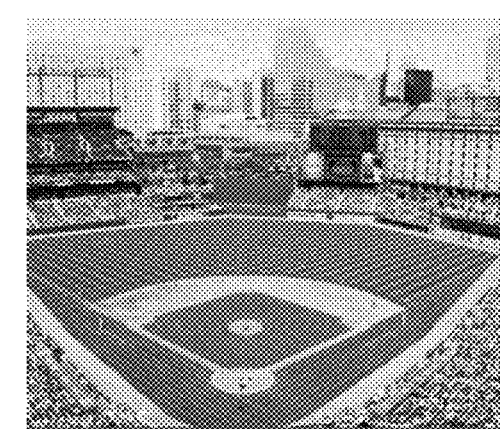
Medium contrast
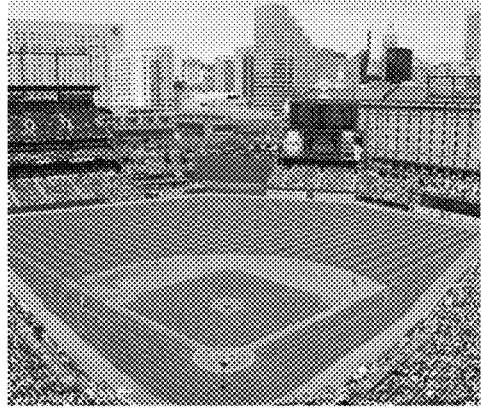
No change
1000D     FIG. 10D

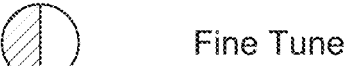
Fine Tune
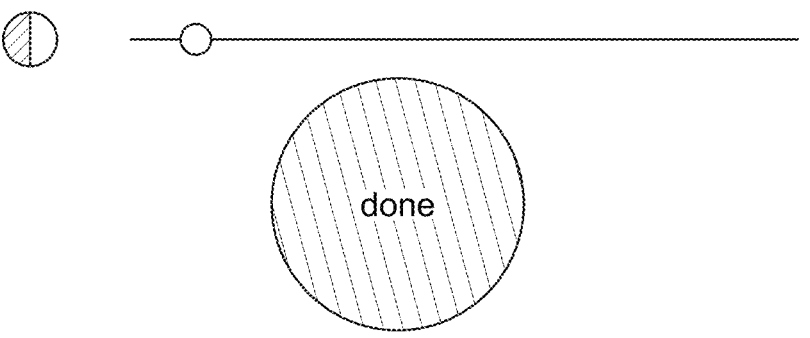
done
1000E
FIG. 10E

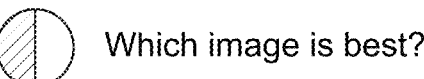 Which image is best?
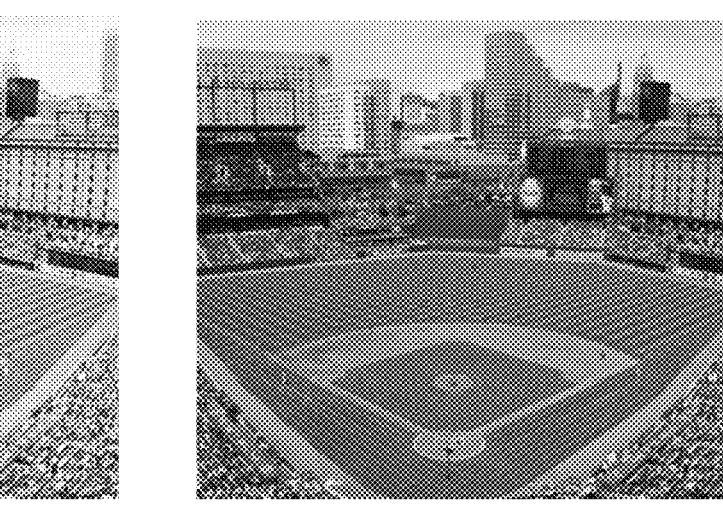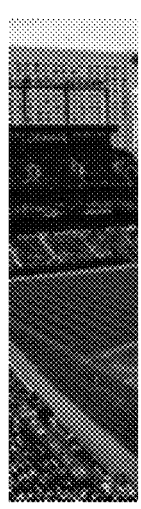
← ---------------------- No change ---------------------- →
1000F     FIG. 10F

 Fine Tune
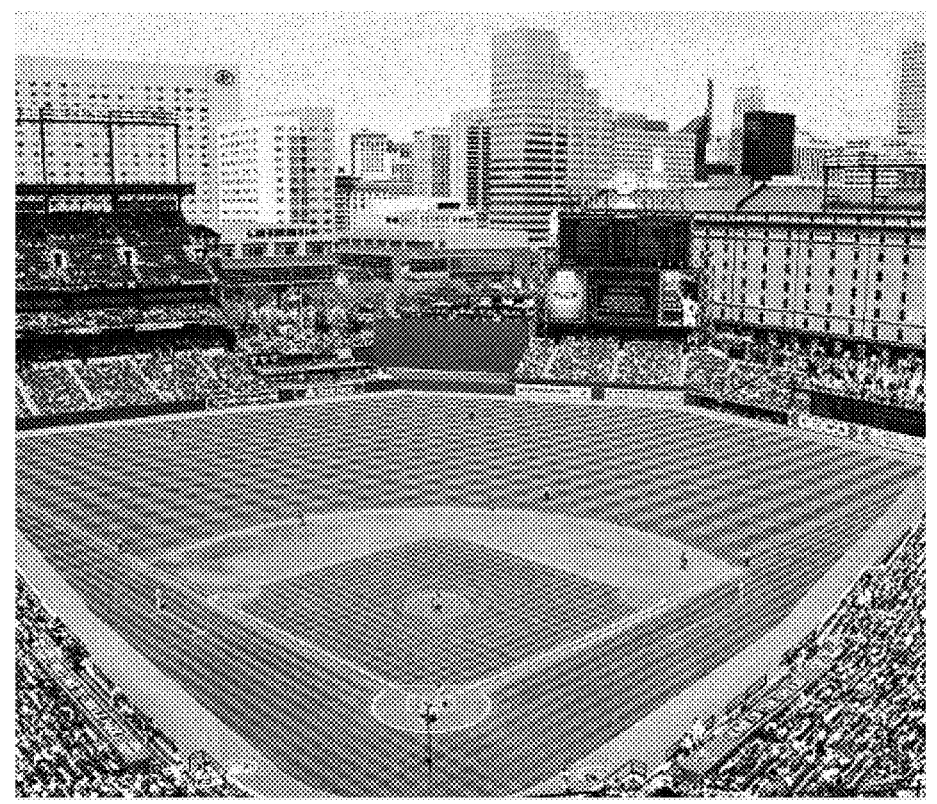
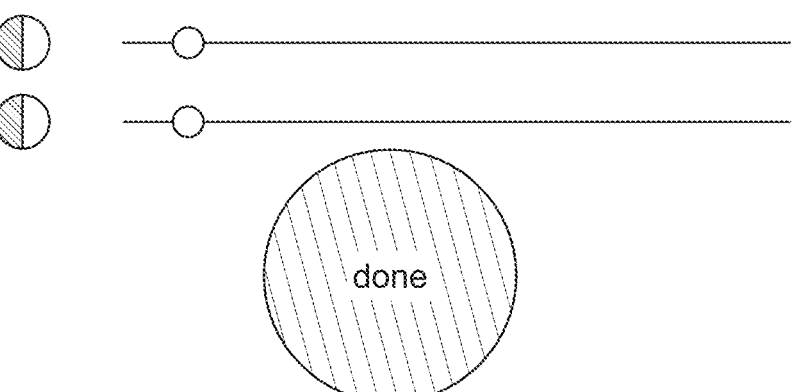
1000G
FIG. 10G

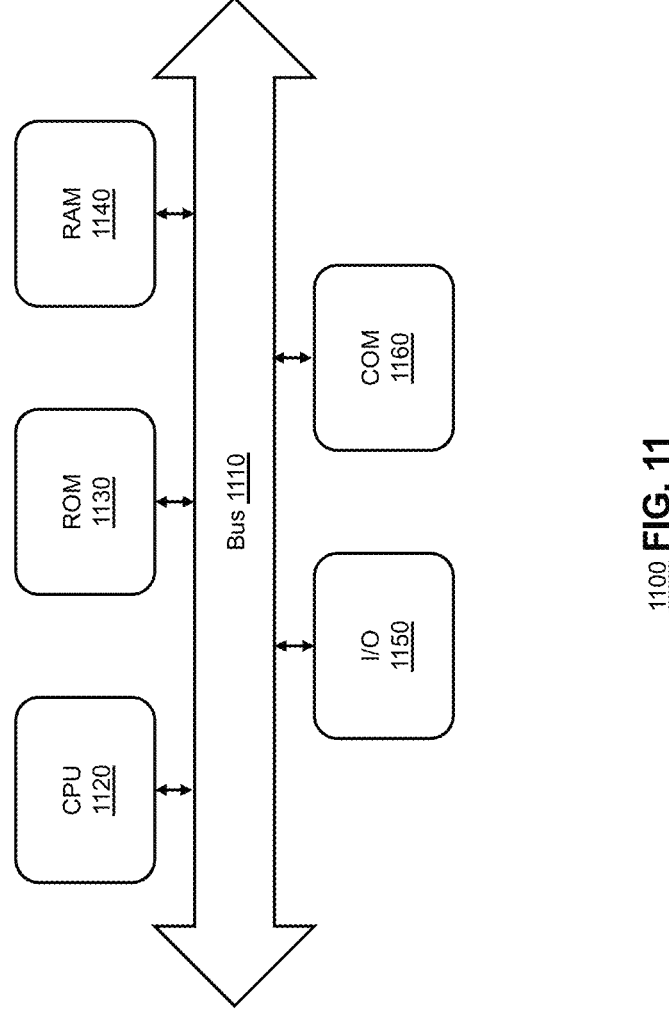
1100 FIG. 11

SYSTEMS AND METHODS FOR VISION ASSISTANCE

CROSS-REFERENCE TO RELATED APPLICATION(S)

This application claims the benefit of priority under 35 U.S.C. §§ 120 and 119(e) of U.S. provisional application No. 63/376,737, filed Sep. 22, 2022, entitled "systems and methods for dynamic and customizable image adjustment for visualization enhancement," the entire contents of which is incorporated herein by reference.

TECHNICAL FIELD

Various aspects of the present disclosure relate generally to systems and methods for enhancement of viewability using technology and, more particularly, to systems and methods for dynamic image adjustment and augmentation in order to present a user with a visual experience in a given context or environment.

BACKGROUND

Generally, vision impairment is a global challenge that affects over 1.1 billion people across the globe. These impairments range from normal age-related vision deterioration, to rare genetic conditions that cause childhood blindness, and span everything in between. These differing populations have unique challenges that are specific to their type of impairment, personal preferences and visual situation. Assistive technology has been developed to support these individuals, but current devices lag behind on technological advances and fall short in their portability, customizability, and affordability.

The present disclosure is directed to overcoming one or more of these above-referenced challenges.

SUMMARY OF THE DISCLOSURE

According to certain aspects of the disclosure, systems, methods, and computer readable memory are disclosed for a system for the dynamic and customizable image adjustment and augmentation for enhanced viewability by a user.

In some cases, a system for vision assistance may include: at least one memory storing instructions; and at least one processor executing the instructions to perform operations. The operations may include: obtaining, from a camera system or a storage system, at least one image of a visual environment or situation, wherein a first image of the at least one image includes a first set of pixels; implementing, in accordance with an adjustment pipeline, one or more image adjustments to the first set of pixels to obtain an augmented set of pixels, wherein the one or more image adjustments are determined: (a) through a user interface by user interactions from a user and/or (b) a recommendation of a machine learning model; and presenting, on at least one display, the augmented set of pixels to the user.

In some cases, a computer-implemented method for vision assistance may include: obtaining, from a camera system or a storage system, at least one image of a visual environment or situation, wherein a first image of the at least one image includes a first set of pixels; implementing, in accordance with an adjustment pipeline, one or more image adjustments to the first set of pixels to obtain an augmented set of pixels, wherein the one or more image adjustments are determined: (a) through a user interface by user interactions from a user and/or (b) a recommendation of a machine learning model; and presenting, on at least one display, the augmented set of pixels to the user.

In some cases, a non-transitory computer readable medium comprising instructions that, when executed by at least one processor, cause the at least one processor to perform a method. The method may include: obtaining, from a camera system or a storage system, at least one image of a visual environment or situation, wherein a first image of the at least one image includes a first set of pixels; implementing, in accordance with an adjustment pipeline, one or more image adjustments to the first set of pixels to obtain an augmented set of pixels, wherein the one or more image adjustments are determined: (a) through a user interface by user interactions from a user and/or (b) a recommendation of a machine learning model; and presenting, on at least one display, the augmented set of pixels to the user.

In some cases, a system for vision assistance may include: at least one memory storing instructions; and at least one processor executing the instructions to perform operations. The operations may include: obtaining, from a camera system, at least one image of a visual environment or situation, wherein a first image of the at least one image includes a first set of pixels; implementing, in accordance with an adjustment layer, one or more image adjustments to the first set of pixels to obtain an augmented set of pixels, wherein the adjustment layer is determined through a user interface by user interactions from a user, the one or more image adjustments include an inversion image augmentation, a contrast image augmentation, an exposure image augmentation, and a color overlay image augmentation, the user interface includes a plurality of widgets to adjust parameters associated with the inversion image augmentation, the contrast image augmentation, the exposure image augmentation, and the color overlay image augmentation, each of the plurality of widgets are a persistent widget type or a gesture widget type; and presenting, on at least one display, the augmented set of pixels to the user, wherein any widgets that are the persistent widget type are displayed overlayed on the augmented set of pixels, and any widgets that are the gesture widget type are not displayed overlayed on the augmented set of pixels except in response to a display widget interaction.

In some cases, a computer-implemented method for vision assistance may include: obtaining, from a camera system, at least one image of a visual environment or situation, wherein a first image of the at least one image includes a first set of pixels; implementing, in accordance with an adjustment layer, one or more image adjustments to the first set of pixels to obtain an augmented set of pixels, wherein the adjustment layer is determined through a user interface by user interactions from a user, the one or more image adjustments include an inversion image augmentation, a contrast image augmentation, an exposure image augmentation, and a color overlay image augmentation, the user interface includes a plurality of widgets to adjust parameters associated with the inversion image augmentation, the contrast image augmentation, the exposure image augmentation, and the color overlay image augmentation, each of the plurality of widgets are a persistent widget type or a gesture widget type; and presenting, on at least one display, the augmented set of pixels to the user, wherein any widgets that are the persistent widget type are displayed overlayed on the augmented set of pixels, and any widgets that are the gesture widget type are not displayed overlayed on the augmented set of pixels except in response to a display widget interaction.

In some cases, a non-transitory computer readable medium comprising instructions that, when executed by at least one processor, cause the at least one processor to perform a method. The method may include: obtaining, from a camera system, at least one image of a visual environment or situation, wherein a first image of the at least one image includes a first set of pixels; implementing, in accordance with an adjustment layer, one or more image adjustments to the first set of pixels to obtain an augmented set of pixels, wherein the adjustment layer is determined through a user interface by user interactions from a user, the one or more image adjustments include an inversion image augmentation, a contrast image augmentation, an exposure image augmentation, and a color overlay image augmentation, the user interface includes a plurality of widgets to adjust parameters associated with the inversion image augmentation, the contrast image augmentation, the exposure image augmentation, and the color overlay image augmentation, each of the plurality of widgets are a persistent widget type or a gesture widget type; and presenting, on at least one display, the augmented set of pixels to the user, wherein any widgets that are the persistent widget type are displayed overlayed on the augmented set of pixels, and any widgets that are the gesture widget type are not displayed overlayed on the augmented set of pixels except in response to a display widget interaction.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIG. 8 depicts an exemplary routine for vision assistance.

FIGS. 9A-9C depict graphical user interfaces and user interactions with a gesture widget.

FIGS. 10A-10G depict graphical user interfaces for helping a user choose the a set of customized augmentation parameters for their needs.

FIG. 11 depicts an example hardware system where these operations could take place.

DETAILED DESCRIPTION

Various aspects of the present disclosure relate generally to the enhancement of visual abilities for individuals who have some usable functional vision, but for whom treatments or remedies for their conditions are not curative.

In general, the present disclosure is directed to methods and systems for allowing these individuals the independence and dignity to make use of the vision they do have, instead of relying on others. As discussed in detail herein, systems of the present disclosure may include dynamic and customizable image and/or video adjustment and augmentation through the use of one or more pieces of hardware that include one or more cameras.

In some cases, the camera may be used to capture images subject to adjustment or augmentation for the user's viewability. In some cases, the adjustments are defined either by the user or through the use of an artificial intelligence.

Thus, methods and systems of the present disclosure may be improvements to computer technology and/or vision assistive technology. For instance, the methods and systems of the present disclosure may enable enhanced customizability, enable higher affordability, and be more widely accessible.

Image Augmentation System

Generally, an image augmentation system may enhance the viewability of a visual environment for a user based on specifications set through a user interface and executed via a local or cloud based processor which is subsequently presented to the user iteratively until the user or AI is satisfied with the viewability.

Figure 1:
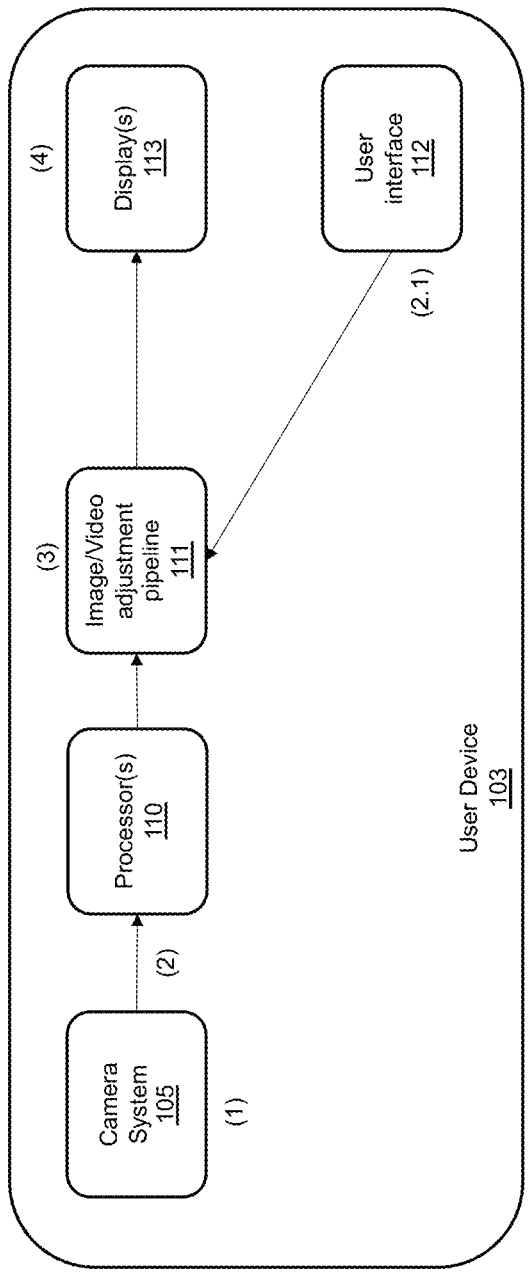
FIG. 1 depicts an example environment for vision assistance.

FIG. 1 depicts an example environment 100 for vision assistance. In some cases, the environment 100 enables a user device 103 to capture an image or video, apply adjustments based on parameters determined by the user, an AI, or combination of both, and then subsequently displayed to the user on one of more displays 113.

The environment 100 may include the user device 103. In some cases, the user device 103 may be a mobile phone, a tablet, a computing device (e.g., a laptop, a desktop computer, and the like), or a camera (e.g., a digital camera), and the like. In some cases, the user device 103 may be an XR device, such as an augmented reality device, a mixed reality device, or a virtual reality device. The user device 103 may include a camera system 105, one or more processor(s) 110 (hereinafter referred to as "processor 110"), a user interface 112, one or more display(s) 113.

The camera system 105 may include one or more cameras. The one or more cameras may, continuously or intermittently, obtain at least one image. For instance, the one or more cameras may obtain an image, a plurality of images, and/or a video feed of images. The one or more cameras may be charge-coupled devices (CCD) and active-pixel sensors (CMOS sensor). Generally, an image may be a color image (e.g., RBG color model, and the like) or a grey scale image.

The processor(s) 110 may execute an operating system (O/S) of the user device 103 and an application hosted on the O/S. The O/S and the application may be stored in one or more memories of the user device 103. For instance, the application may be a mobile application (e.g., for a mobile phone, a tablet, and the like), a desktop application (e.g., for the laptop or desktop computer), a XR application (e.g., for an augmented reality device or mixed reality device, and the like), a visual enhancement application (e.g., on a digital camera, and the like).

The user interface 112 may include one or combinations of: a touch screen (e.g., combined with one or more of, or separate from, the display(s) 113), and/or user input devices (e.g., a mouse, a keyboard, buttons, switches, and the like). The user interface 112 may receive user inputs and transmit the user inputs to the processor 110, and the processor 110 may execute functions or actions in accordance with the O/S or the application.

The display(s) 113 may be integrated with or separate from the user device 103. The display(s) 113 may output graphical user interfaces in accordance with instructions and/or data from the O/S and/pr the application. The display (s) 113 may include one or combinations of LCD displays, LED displays, and the like.

In some cases, the user device 103 may interact with a user, via user inputs, to display adjusted image(s) on the display(s). For instance, in certain cases, the user device 103 may perform the following operations:

In operation (1), the camera system 105 may capture an image, set of images, or video of a visual situation. A visual situation may include reading (e.g., a menu at a restaurant or a book at home), observing an event (e.g., a sports, music, or other entertainment event), observing an educational event (e.g., a classroom environment), or observing museums, art, exhibits, and the like.

In operation (2), the camera system 1045 may transmit the image, set of images or video to the processor 110. The processor 110 may converts the image, set of images, or video into pixels, and displays the pixels on one or more display(s) 113 to a user. For instance, each image may have a set of pixels, and the processor 110 may display the set of pixels to display the image. In the case of multiple images, the processor 110 may display the set of pixels for each of the multiple images adjacent to each other or in sequence as a slide show. In the case of a video feed (e.g., a camera feed or video upload), the processor 110 may display the set of pixels for each of the images of the video feed in accordance with time stamps for the video feed (e.g., a first set, then a second set, and so on). In some cases, the processor 110 may obtain an image, set of images, or video from a memory of the user device 103 (e.g., from a camera roll or image storage system of the user device 103).

In some cases, the user interface 112 may enable a user to make a personalized set of image adjustment or augmentation decisions. For instance, the user may make a selection based on their preferences (e.g., in real-time), choose from a list of previously saved preferences (e.g., a preset file 505), engage a neural network 701 (see, e.g., FIG. 7), or engage a preference helper system (see, e.g., FIGS. 10A-10G), or a combination of any of the foregoing.

In operation (2.1), the user interface 112 may transmit the augmentation and adjustment decision information from the user interface 112 to the processor 110. In some cases, the user may make selections of image adjustment or augmentation decisions in real-time via user inputs on the user interface 112 and the user interface 112 may transmit the selections. In some cases, the user may make a selection of previously saved preference (e.g., on a menu). Further details of user selection of the image adjustment or augmentation decisions are discussed herein.

The user device 110 may determine an adjustment pipeline 111 based on the image adjustment or augmentation decisions received from the user interface 112. The adjustment pipeline 111 may include instructions for the processor 110 to implement, so as to generate an adjusted image based on the image adjustment or augmentation decisions.

In operation (3), the processor 110 may implement adjustment pipeline 111 on the image, the set of images, or the video feed. In some cases, the processor 110 may change each pixel in the image(s) or video based on the set of adjustment parameters. In some cases, the processor 110 may change some or subsets of pixels in the image(s) or video based on the set of adjustment parameters.

In operation (4), the processor 110 may transmit the adjusted image (or images) to the one or more display(s) 113. The one or more display(s) 113 may output the adjusted image (or images), so as to be viewable by the user. For instance, in the case of an XR application, a user device (e.g., a mobile phone) or a server (e.g., cloud server 615) may process the images, and transmit the adjusted images to an external display (via wired or wireless connection).

In some cases, the user device 103 may execute operations (1) through (4) so that adjustments may be iterated until the user is satisfied with the adjusted image(s) or video the user is viewing. That is, different images may be adjusted (e.g., of a same environment) based on a continuous or intermittent feed from the one or more cameras and/or user selections of parameters/preset filters. In some cases, only operations (2) through (4) may be iterated until the user is satisfied with the adjusted image(s) or video they are viewing. That is, a same image (or images) may be adjusted until the user is satisfied.

Adjustment Pipeline

Figure 2:
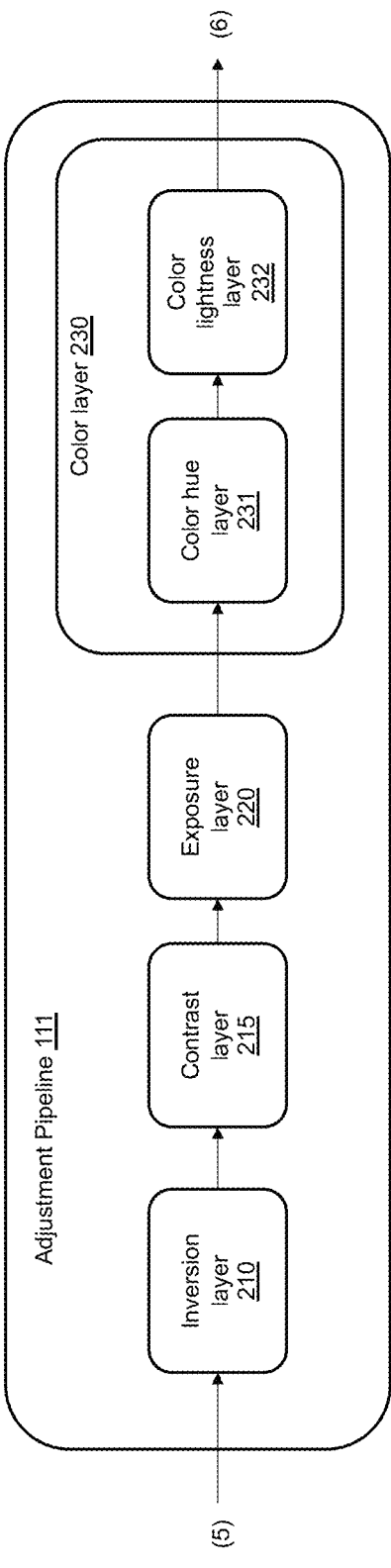
FIG. 2 depicts a block diagram schematically showing the order of image adjustments as applied by an adjustment pipeline.

FIG. 2 depicts a block diagram 200 schematically showing an order of image adjustments as applied by an adjustment pipeline 111. The features of FIG. 2 may be applied to any of FIGS. 1, 3, 4, 5, 6, 7, 8, 9A-9C, 10A-10G, and 11.

The block diagram 200 may depict an order in which adjustments are added to a set of images in adjustment pipeline 111 either continuously or intermittently as image (s) or video are acquired through camera system 105. The adjustments may include an inversion layer 210, a contrast layer 215, an exposure layer 220, and/or a color overlay 230 (including one or both of color hue 231 or color lightness 232).

Generally, the sequence of application of each of adjustments may proceed in an ordered sequence, or as a user interacts with a user device. In a first case (depicted in FIG. 2), the adjustments may be applied in the following order: (1) the inversion layer 210, (2) the contrast layer 215, (3) the exposure layer 220, (4) color hue 231 of color overlay 230, and (5) color lightness 232 of the color overlay 230. In this case, adjustments applied in accordance with the first case may provide higher quality image adjustments (as compared to a different order of application for certain users (e.g., user with some contrast sensitivity). That is, the adjustments enable the users to view environments that the users would not otherwise be able to view as clearly. In some cases, increased independence in performing visual tasks in the environment with the adjusted image has been reported. Visual tasks may include reading, viewing hand gestures, or tracking movement. In other cases, the sequence may be generally the same but one or more of the adjustments may be placed in a different slot of the sequence.

As an example, the user device 103 may perform the following operations in accordance with the first case:

In operation (5), the processor 110 may input an image to the adjustment pipeline 111 and apply the inversion layer 210. For instance, the processor 110 may apply the inversion layer 210 if the user selected the inversion layer 210 (e.g. in real-time or previously).

The inversion layer 210 may include a filter that inverts or augments the colors of the incoming image in one or more ways. For instance, an inversion layer may completely invert all colors in an image, may adjust all colors in an image to grayscale, or may map bright areas to a color or set of colors and dark areas to another set of colors. In some cases, the inversion layer 210 may overlay a first color with a second color. For example, the first color and second color may be (1) yellow on blue, (2) blue on yellow, (3) yellow on black, or (4) black on yellow. These options have been found to provide better viewability of scenes for users with certain conditions, such as users with low vision conditions.

Next, the processor 110 may apply the contrast layer 215. For instance, the processor 110 may apply the contrast layer 215 if the user selected the contrast layer 215 (e.g. in real-time or previously).

The contrast layer 215 may increase or decrease the contrast of the image by a predefined amount or a user selected amount. In some cases, the user may select the contrast amount from a defined range. For example, a contrast may be able to scale from 0 to 100, but the system may only allow the user to select an amount from a more limited range (e.g., a selection between 20 and 80). A benefit of the more limited range of selection is to reduce user selection to a range that has a greater affect for user viewability, whereas selections outside that range are not beneficial to viewability generally, e.g. for users with certain conditions, such as users with low vision conditions.

Next, the processor 110 may apply the exposure layer 220. For instance, the processor 110 may apply the exposure layer 220 if the user selected the exposure layer 220 (e.g. in real-time or previously).

The exposure layer 220 may increase or decrease the exposure of the image by a predefined amount or a user selected amount. In some cases, the user may select the exposure amount from a defined range. For example, an exposure may be able to scale from 0 to 1M, but the system may only allow the user to select an amount from a more limited range (e.g., a selection between 0 and 10 k). A benefit of the more limited range of selection is to reduce user selection to a range that has a greater affect for user viewability, whereas selections outside that range are not beneficial to viewability generally, e.g. for users with certain conditions, such as users with low vision conditions.

Next, the processor 110 may apply the color overlay layer 230. For instance, the processor 110 may apply the color overlay layer 230 if the user selected the color overlay layer 230 (e.g. in real-time or previously).

The color overlay layer 230 may include one or multiple individually adjustable parameters including color hue 231 and color lightness 232. The adjustable parameters may determine the hue, saturation, lightness (HSL) definition of the color layer 230 to be applied. In some cases, the processor 110 may convert the HSL definition to an RBGA value before the processor 110 applies the HSL definition to the image. For instance, the color hue 231 and/or the color lightness 232 may enable users to minimalize visual clutter, and/or minimize or transform visual artifacts glare.

In operation (6), the processor 110 transmits the adjusted image to the one of more display(s) 113, so the adjusted image may be viewed by the user.

As discussed above (e.g., in real-time), the process applying the individual adjustment parameters may be iterated until a user is satisfied with the image(s) or video displayed to the user.

In some cases, the process may apply the layers, in real-time before display, on a camera feed from a camera of the system. In this case, when a user interactions indicates a zoom (in or out), the software may request the camera to perform a corresponding optical zoom (in or out); the camera may optically zoom (in or our); and the software may display the camera feed with the corresponding change in zoom. In response to a user interaction indicating pause (or image selection) of the camera feed, the software may capture a last frame of the camera feed (referred to as "captured frame image"). This is in contrast to instructing the camera to capture an image and receiving the image from the camera. In this case, the user may perform adjustments to various parameters of the layers on the captured frame image, including a zoom instruction. In this case, the zoom instruction may digitally zoom (in or out) on the captured image frame, as opposed to an optical zoom of the camera.

Common Widget

Figure 3:
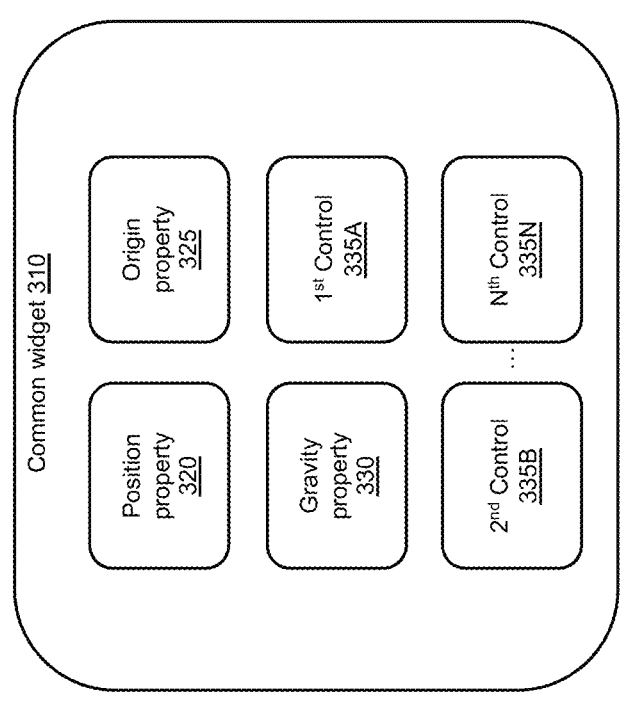
FIG. 3 depicts a block diagram of a user interface common widget.

FIG. 3 depicts a block diagram 300 of a common widget 310 for a graphical user interface. The features of FIG. 3 may be applied to any of FIGS. 1, 2, 4, 5, 6, 7, 8, 9A-9C, 10A-10G, and 11.

The common widget 310 (also called a "persistent widget") may allow the user a method of adjusting or augmenting various controls through the user interface 112. Each widget may take up space (e.g., a number of pixels) within the user interface 112, defined as the widget control area (see e.g., 904 and 906 of FIG. 9A). In some cases, the widget control area may be an area in which the widget controls can be adjusted within the user interface 112. The common widget 310 may present to the user as a set of buttons each of which corresponds to a control within that widget. The user (via user input(s)) may select a button of that widget to adjust one control at a time. For instance, the user may interact with the user interface within the widget control area to adjust the selected control. A common widget may include one or combinations of a position property 320, an origin property 325, a gravity property 330, and a set of controls 335A, 335B, . . . 335N.

The position property 320 may describe where the widget exists within the user interface. The position of a widget may be adjustable by the user to any placement within their user interface.

The origin property 325 may describe the position of the smallest area a single control in that widget can take up when not being actively engaged by the user.

The gravity property 330 may describe the position and orientation of the largest amount of space a control within the widget can take up when that control is being actively used. Thus, the widget may be displayed in a first state when not being interacted with by a user (e.g., in accordance with the origin property 325), and may be displayed in a second state when being interacted with by the user (e.g., in accordance with the gravity property 330).

The set of controls 335A, 335B, . . . 335N may describe the adjustment parameter or set of adjustment parameters that a widget can enable a user to adjust within the widgets control area. For instance, the set of controls 335A, 335B, . . . 335N may include only one, two, three, or a plurality of controls. In some cases, the widget may include only a first control 335A. In some cases, the widget may include a first control 335A and a second control 335B, and so on.

Methods of adjusting a control within a widget may include sliders, toggles, a software action or set of actions, or the loading/saving of a preset file 505 (e.g., JSON, and the like). A slider may be adjusted in two dimensions which may include up/down or left/right. The amount of adjustment may correspond to the position of the slider, either alone or in combination with another slider or action. Toggles may act as a switch to turn a functionality or parameter on or off or to switch between different adjustments with minimal UI.

An action or set of actions may include pausing of the image or video feed, switching the camera from which input images or video are being acquired, or the launch of a different software screen.

Gesture Widget

Figure 4:
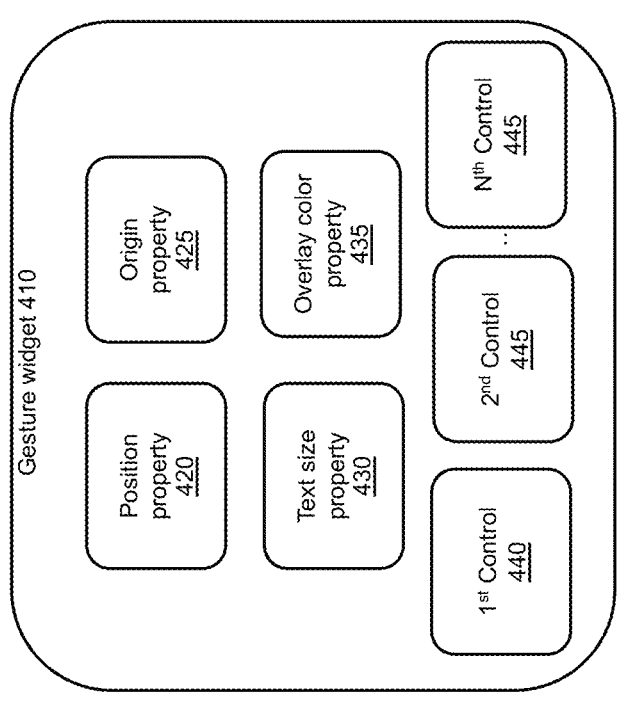
FIG. 4 depicts a block diagram of a user interface gesture widget.

FIG. 4 depicts a block diagram 400 of a gesture widget 410 for a graphical user interface. The features of FIG. 4 may be applied to any of FIGS. 1, 2, 3, 5, 6, 7, 8, 9A-9C, 10A-10G, and 11.

The gesture widget 410 may provide functional control of actions or parameter adjustments without overlaying the controls or functions on the images, thereby making image adjustments easier for users familiar with the functional control of gesture widgets, and not obscuring environmental information. The gesture widget 410 may be a gesture widget type (as compared to a persistent widget type, discussed above with respect to the common widget 310). The gesture widget 410 may only be displayed in response to certain user inputs (e.g., defined gesture operations to display the widget) and enable user gestures to adjust parameters or actions on the user interface, instead of displayed UI graphics for buttons and the like. It therefore is less visually invasive within the user interface. Each widget takes up space within the user interface, defined as the widget control area, or area in which the widget controls can be adjusted within the user interface. A gesture widget 410 may include one or combinations of: a position property 420, an origin property 425, a text size property 430, an overlay color property 435, and a set of controls 440A, 440B, . . . 440N.

The position property 420 may describe where the widget exists within the user interface. The position of a widget is adjustable by the user to any placement within their user interface.

The origin property 425 may describe the position of the smallest area a single control in that widget can take up when not being actively used by the user.

The text size property 430 may dictate the size of the text used within the user interface to describe the active control within the widget.

The overlay color property 435 may dictates the color of the text used within the user interface to describe the active control within the widget. This color may be adjusted in order to allow for visual clarity for the user.

The set of controls 440A may describe the adjustment parameter or set of adjustment parameters that a widget can enable a user to adjust within the widgets control area within the user interface.

Methods of adjusting a control within a widget can include any combinations of gestures on the UI, user inputs on UI elements, or user inputs using other human-machine interface methods, such as computer-vision recognition, hand-gesture recognition (e.g., using pressure or neural sensors), voice, brain neural interfaces, and the like. For instance, UI elements may include sliders, toggles, or software buttons. a software action or set of actions, or the loading/saving of a preset file 505. These actions are presented without displayed UI graphics for buttons and sliders and may rely instead on up/down gestures within the widgets control area to adjust sliders, taps to engage toggles or actions or presets and left/right swipes to change between active controls available in each widget, and like.

An action or set of actions may include pausing of the image or video feed, switching the camera from which input images or video are being acquired, or the launch of a different software screen.

Preset File

Figure 5:
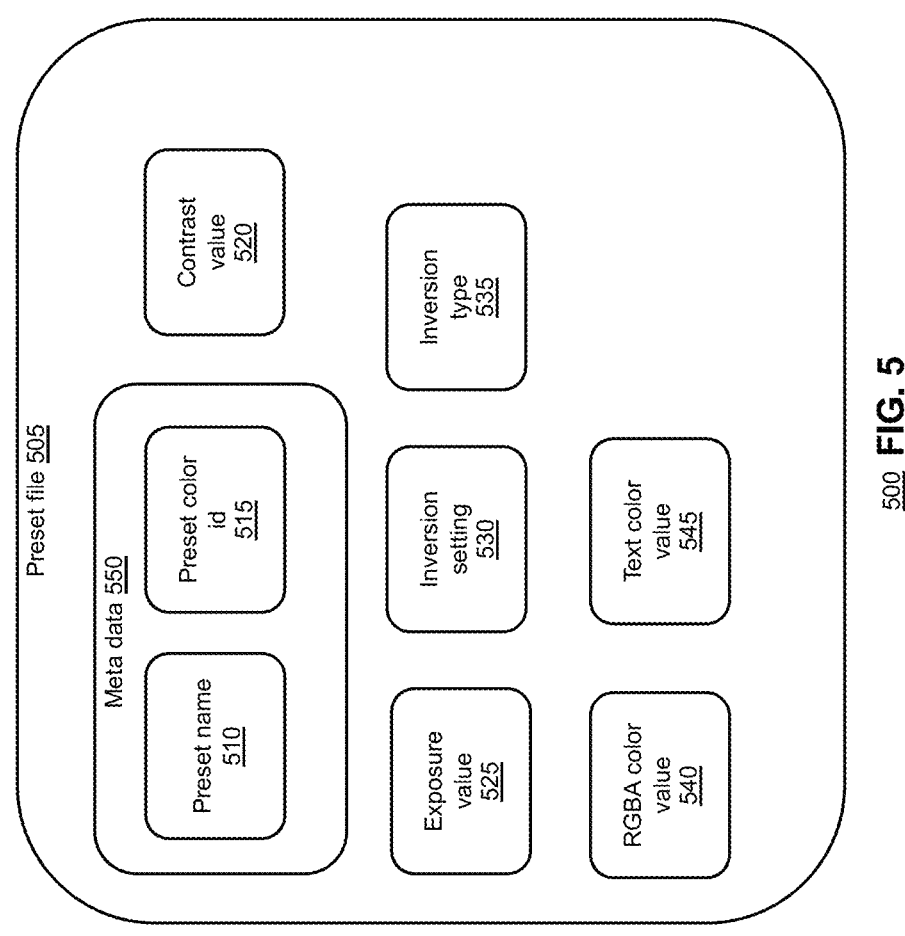
FIG. 5 depicts a block diagram of a preset file.

FIG. 5 block diagram 500 of a preset file 505. The features of FIG. 5 may be applied to any of FIGS. 1, 2, 3, 4, 6, 7, 8, 9A-9C, 10A-10G, and 11.

The preset files 505 may be generated by the user through the user interface, through a neural network or other artificial intelligence, or a combination of both. The preset files 505 may be saved locally on the users device 605, or transmitted to a server 615 which then stores the preset file 505 in cloud storage 610 (see FIG. 6). A preset file 505 may include one or combinations of (if selected and/or adjusted by the user, neural network, or AI): meta data 550, a contrast value 520, an exposure value 525, an inversion setting 530, an inversion type 535, a RGBA color value 540, and/or a text color value 545. In the case that one of the adjustments or fields (e.g., meta data 550) is not selected or input by a user, the preset file 505 may omit the data, include a null value, or include a default value.

Meta data 550 may allow a user to identify a preset file they have previously saved. The meta data 550 may include a preset name 510 and, optionally, a preset color ID 515.

The preset name 510 may be a string of text. The present name 510 may be displayed to a user within the user interface to allow them to identify the preset file and or its function (e.g., in a selection menu).

The preset color ID 515 may be an RGB value set by the user and displayed as a color back to them on the user interface. The preset color ID 515 may indicate a preset or its function in order to aid a visually impaired user in identifying the preset or its function. The user may map these colors to different preset files (for different functions).

The preset can be saved with just one or both of these meta data parameters.

The contrast value 520 may dictate the adjustment of image contrast value that will be taken by the processor for the adjustment layer when a preset is selected to be implemented on an image, set of images or video.

The exposure value 525 may dictate the adjustment of image exposure value that will be taken by the processor for the adjustment layer when a preset is selected to be implemented on an image, set of images or video.

The inversion setting 530 may indicate an on/off state. The on/off state may indicate the use or lack of use of an inversion filter. In some cases, the inversion setting 530 may be combined with any other adjustment parameters available (e.g., the exposure value 525, the contrast value 520, and the like).

The inversion type 535 may dictate an inversion filter option to be applied. The inversion filter may be one of (as selected by a user): a basic inversion, grayscale, inverted grayscale, blue/yellow filters, red/black filters, yellow/black filters, and/or any combination of two colors.

The RGBA color value 540 may enable an overlay of a specific color filter in the order described in FIG. 2. The color values may be set by the user using the Hue saturation lightness definition of color and are then converted to RGBA before being applied by the processor in the adjustment pipeline.

The text color value 545 may save the RGB color value of the text displayed to identify the active control withing the widget control area of a gesture widget.

Cloud Storage of Preset File

Figure 6:
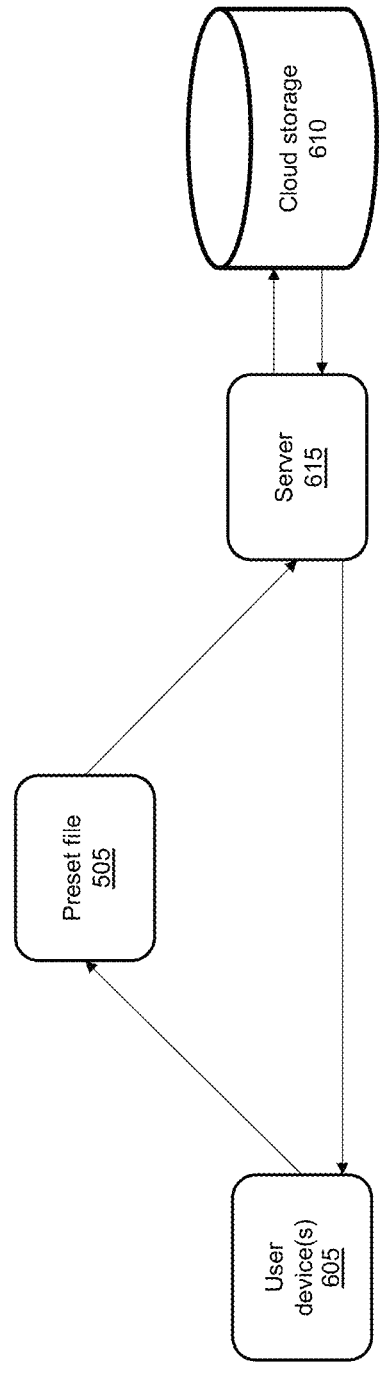
FIG. 6 depicts a block diagram of a user device interacting with a cloud service.

FIG. 6 block diagram 600 of a user device 605 interacting with a cloud service (e.g., server 615 and cloud storage 610). The features of FIG. 6 may be applied to any of FIGS. 1, 2, 3, 4, 5, 7, 8, 9A-9C, 10A-10G, and 11.

The block diagram 600 may describe the communication between user device(s) 605, the server 615 and the cloud storage 610 as it relates to the saving and loading of a preset file 505.

The preset file 505 may be generated on a user device(s) 605 via the user interface 112. The user device(s) 605 may be associated with different users (e.g., accounts of users on the server 615) and be a user device, such as the user device 103, discussed above.

The preset file 505 may be saved locally on the user device 605. The preset file 505 may also simultaneously (or alternatively) be transmitted to the server 615. The server 615 may save the preset file 505 to the cloud storage 610. The cloud storage 610 may store the preset file 505 in association with a user (e.g., user device associated with the user, a user account, a user ID, and the like). The cloud storage 610 may include a data structure to store the preset file 505 in association with the user. For instance, the data structure may be a relational database (e.g., SQL and the like) or a non-relational database (e.g., noSQL, and the like). The server 615 may store one or a plurality of preset files 505 for the user. Each preset file 505 may have a preset file ID, so as to be retrieved by the preset file ID.

When a preset file 505 is requested from the user through the user interface 112, the preset file 505 may be pulled from memory within the users device 605 or the user device 605 may transmit a call to server 615 to retrieve the preset file 505 from cloud storage 610 which will send the preset file 505 to the user device 605.

Machine Learning Features

Figure 7:
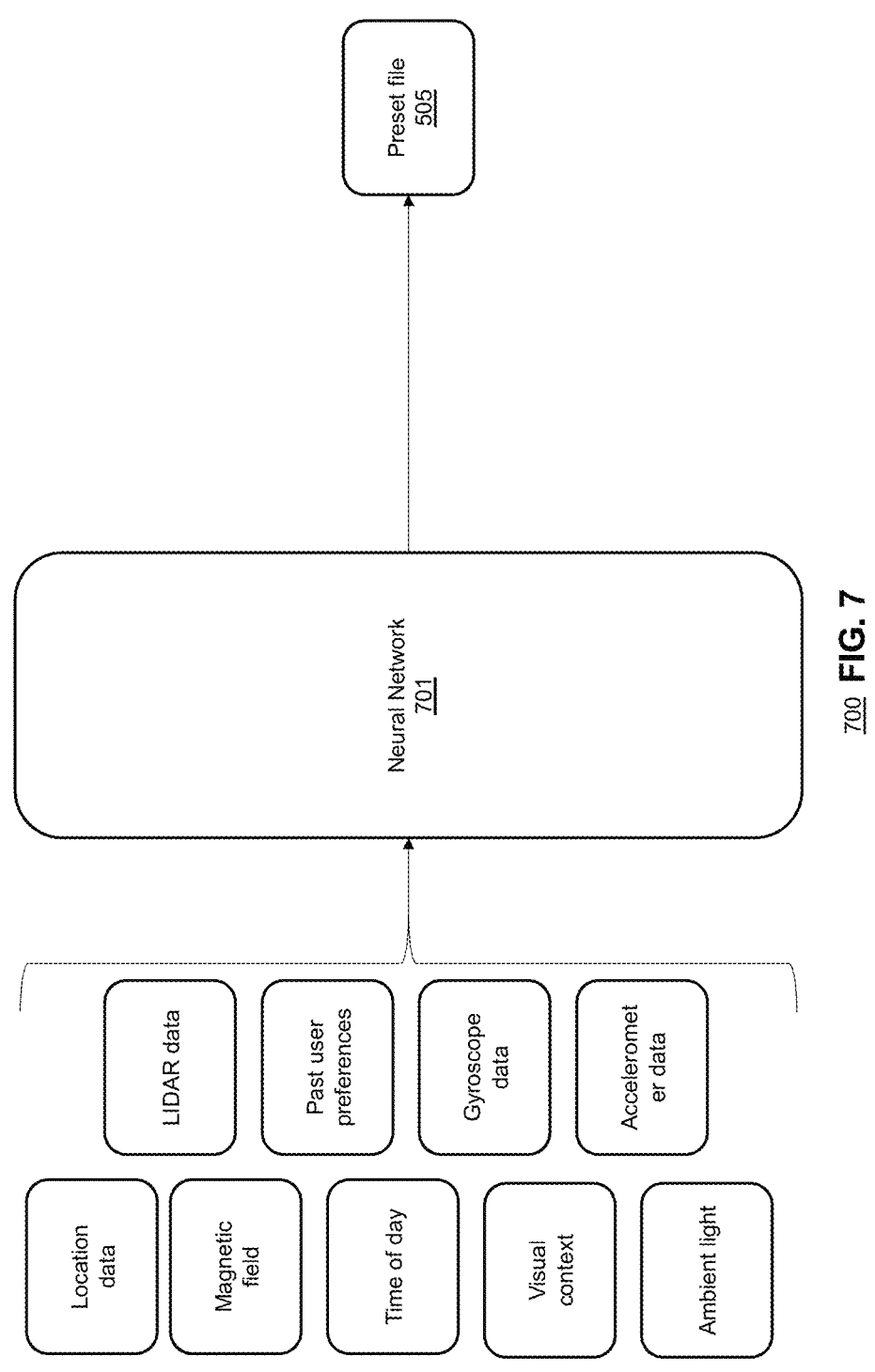
FIG. 7 depicts a block diagram of machine learning model that outputs a preset file for a user.

FIG. 7 depicts a block diagram 700 of a machine learning model 701 that outputs a preset file for a user. The features of FIG. 7 may be applied to any of FIGS. 1, 2, 3, 4, 5, 6, 8, 9A-9C, 10A-10G, and 11.

The user device 103 (or the server 615) may process image, video, or camera feeds through the machine learning model 701. The machine learning model 701 may be a neural network and may have as its inputs (e.g., as a feature vector) data collected regarding the environment of the users device, the visual context, and/or the past preferences of a given user.

Environmental factors may include but are not limited to ambient light, LIDAR information, location information, magnetic field, time of day, visual context, accelerometer and/or gyroscope information.

The machine learning algorithm may consist of neural networks which take as input these environmental factors and outputs a set of image adjustments and augmentations that are appropriate for a specified user in that visual environment and context.

These images adjustment output by the machine learning model 701 may constitute in whole or in part of preset file 505 as defined above but are not limited to the parameters defined in the preset file 505.

The machine learning model 701 may alternatively or additionally recommend to a user a previously saved preset file 505 or set of preset files based on environmental factors or visual context.

To train the machine learning model, the server 615 may make calls to processor 110 to collect and aggregate de-identified user data. The data collected may include but are not limited to those parameters (discussed above) in combination with the combination of image adjustments that a user utilizes in those conditions. It may also aggregate data on environmental factors and adjustment parameters at the time a preset file 505 is saved to a user device 605 or to cloud storage 610. As an output the machine learning model may provide the user with, in whole or in part, a preset file 505 which can be used in the specific visual environment.

Example Routine(s)

FIG. 8 depicts an exemplary routine 800 for vision assistance. The features of FIG. 8 may be applied to any of FIGS. 1, 2, 3, 4, 5, 6, 7, 9A-9C, 10A-10G, and 11. In the routine 800, the method may be performed by one or more systems, such as a processor. Specifically, the user device processor or cloud-based processor.

The routine 800 may start at block 802, where the user device 103 may obtain, from a camera system or a storage system, at least one image of a visual environment or situation. In some cases, the camera system may provide a camera feed or an individual image (e.g., as a part of a capture event), or a storage system of the user device may provide an image retrieved from the storage system. A first image of the at least one image includes a first set of pixels. For instance, in some cases, the camera system may capture visual data. For instance, the camera system may capture an image, set of images, or video, as discussed herein.

At block 804, the user device 103 may implement, in accordance with an adjustment pipeline, one or more image adjustments to the first set of pixels to obtain an augmented set of pixels. In some cases, the one or more image adjustments may be determined: (a) through a user interface by user interactions from a user and/or (b) a recommendation of a machine learning model. For instance, the user device 103 may translate the visual data (e.g. camera feed, images, video, etc.) to at least one image (e.g., a most recent frame of a camera feed). For instance, the user device 103 may translate the visual data into pixels. Next, the user device 103 may apply image adjustments to the pixels in accordance with the settings currently selected by the user (e.g., from a preset file, a machine learning output, and the like). The values of these pixels may be changed based on the set of adjustment parameters set through the user interface. These adjustments may be created manually be the user, determined by an artificial intelligence, or a combination.

At block 806, the user device 103 may present, on at least one display, the augmented set of pixels to the user.

In some cases, the one or more image adjustments includes a color overlay image augmentation. In some cases, the color overlay image augmentation enhances viewability of the visual environment or situation for the user. Thus, some low vision users may receive vision assistance in a quick and efficient manner, and increase their functional range of vision ability.

In some cases, the recommendation of the machine learning model may include a custom set of image adjustment parameters for the user to enhance viewability of the visual environment or situation for the user. For instance, the machine learning model may take context of the location, and user preferences into account, to recommend a set of parameters that would enhance a viewability of the user (e.g. based on a user's low vision condition). In some cases, the machine learning model may determine the recommendation based on user context data, environmental factors data, and location data. For instance, the machine learning model may process some or all of user context data, environmental factors data, and location data, and output an inference setting one or more of: inversion image augmentation, a contrast image augmentation, an exposure image augmentation, and a color overlay image augmentation, or any combination of the foregoing, or other image augmentation. Thus, in some cases, the user's selection process may be less burdensome, which may assist older generations or those with low vision from having to interact with a user device extensively to make adjustments to the parameters.

In some cases, the one or more image adjustments may be retrieved from a preset file, and the preset file may store the one or more image adjustments as adjustment parameters. In some cases, the preset file may be configured to allow for quick access to the one or more image adjustments. Thus, users may re-apply set parameters to images without having to re-calibrate the settings (e.g., based on a circumstances). Thus, low vision users may reduce wait time or increase functional vision range in daily activities.

In some cases, the user device 103 may enable a method for supervised user creation of image augmentation parameters. For instance, the user device 103 may use a walk-through of multiple options for each potentially adjustable parameter. Thus, the user device 103 may support users with less visual or technological abilities, while still providing image adjustments that are functionally useful for these populations.

In some cases, the one or more image adjustments may include an inversion image augmentation, a contrast image augmentation, an exposure image augmentation, and/or a color overlay image augmentation. In some cases, the one or more image adjustments may be applied in a defined sequence to the set of pixels. In some cases, the defined sequence may include: applying, if active, the inversion image augmentation; applying, if active, the contrast image augmentation; applying, if active, the exposure image augmentation; and applying, if active, the color overlay image augmentation. The inventors of the present disclosure have determined that the defined sequence yields enhanced vision assistance to user with low vision conditions, thereby enabling low vision users with better viewability of environments. In some cases, the color overlay image augmentation includes a color hue image augmentation and a color lightness image augmentation. In some cases, the color hue augmentation is applied before the color lightness augmentation in the defined sequence.

In some cases, obtaining the image(s), implementing the adjustment pipeline and presenting the adjusted image(s) happens continuously and in real time on a camera feed of the camera system. Thus, the user may receive real-time feedback on how parameters are adjusting the image(s) and make, if any, corrections to parameters of the adjustments.

In some cases, the user device 103 is configured to: in response to receiving a user interaction for a zoom operation, instruct the camera system to perform an optical zoom (or a digital zoom, based on the type of user device or camera system); and obtaining the updated camera feed. For instance, an application layer of the user device 103 may instruct a camera application of the user device 103 to adjust a zoom of the camera system, and receive an adjusted camera feed.

In some cases, the user device 103 may be configured to: in response to receiving a user interaction for a pause operation, capture a last frame from the camera feed; and implement the adjustment pipeline on the last frame and presenting on the adjusted last frame from the camera feed. In some cases, the user device 103 may be configured to: in response to receiving a user interaction for a zoom operation, digitally zoom on the last frame from the camera feed; and implement the adjustment pipeline on the digitally zoomed last frame and present on the adjusted digitally zoomed last frame from the camera feed. Thus, the image adjustments may be applied without being limited to a type of O/S or physical hardware of the user device 103, thereby increasing access to vision assistance for low vision users.

Therefore, the methods and systems of the present disclosure may enable enhanced customizability, enhanced vision for low vision users, enable higher affordability, and be more widely accessible.

Gesture Widget Operations

FIGS. 9A-9C depict graphical user interfaces 900A, 900B, 9000 of user interface 112 of the application of the user device 103, and user interactions with a gesture widget. The features of FIGS. 9A-9C may be applied to any of FIGS. 1, 2, 3, 4, 5, 6, 7, 8, 10A-10G, and 11.

The user interface 112 may be presented (via a display 113 of the display(s) 113) to the user and enables the user to make changes to adjustment controls either manually or with the use of an artificial intelligence (e.g., the machine learning model 701, discussed above). The user interface 112 may include any number or combination of gesture widgets 425 and/or common widgets 410. Each widget may be individually customized and placed anywhere within the user interface as defined by the user, or an artificial intelligence (e.g., a different machine learning algorithm from that discussed above). Multiple widget controls can be placed in different sections of the user interface.

The user interface 112 may exist on a grid system 902 (not displayed to users). The grid system 902 may include any number of sectors within the user interface. For instance, each sector may be a similar size (or different in size). The sectors may be square or rectangular. In some cases, the grid system may be an M by N array of sectors. The widgets may be placed on sectors of the grid system. In some cases, only one widget may be placed on a one sector. In some cases, more than one widget may be placed on a sector.

Widget controls may include enable a user to save a combination of image adjustments and augmentation parameters selected using the user interface (or other method, such as via the machine learning model 701) as in whole or in part a preset file 505. The user device 103 may then save the file either locally on the user device 103 (or on set of user devices associated with the user), in the cloud, or both. In this manner, the user may retrieve those customized adjustments at a later time. In some cases, the machine learning model 701 may recommend the preset file to the user.

Widget controls may also include but are not limited to any combination of adjustment parameters as defined in the adjustment pipeline 111 of FIG. 2.

In particular, in graphical user interface 900A, the bottom gesture widget 410 may be associated with a region defined by grid cells 904 and 906. This may define where the gesture widget 410 is displayed (when displayed) and where user interactions with the gesture widget may be analyzed, as discussed herein.

For instance, in graphical user interface 900B, a user my input a gesture operation (while the gesture widget is not displayed on the user interface 112, and while the common widgets are displayed), which includes one or more parts. In this case, the one or more parts include: a touch 908, a slide 910 for a length L, and a release 912.

The user device 103 may determine various parameters with these gesture operations, such as locations, lengths, times, pressures, number of fingers, and the like. Based on these parameters, the user device 103 may determine certain actions. In graphical user interface 9000, the user device 103 may perform the determined action, such as displaying an adjusted image.

Thus, in some cases, the user interface includes a plurality of widgets to adjust parameters associated with the inversion image augmentation, the contrast image augmentation, the exposure image augmentation, and the color overlay image augmentation. In some cases, each of the plurality of widgets are a persistent widget type or a gesture widget type. In some cases, any widgets that are the persistent widget type are displayed overlayed on the augmented set of pixels. In some cases, any widgets that are the gesture widget type are not displayed overlayed on the augmented set of pixels except in response to a display widget interaction. In this manner, user interactions to control the parameters or actions may be reliant on menu items (e.g., of common widgets) and enable the user to view a larger area of the environment, which may be highly beneficial for low vision users.

In some cases, the user interface is configured to be customized by user selections of settings. For instance, the user selections of the settings may set a widget as the persistent widget type or the gesture widget type. For instance, a common widget 310 of FIG. 9A-9C may be changed to gesture widget (and the like).

In some cases, the user selections of the settings may set a widget to control specific parameters associated with one or combinations of the inversion image augmentation, the contrast image augmentation, the exposure image augmentation, and the color overlay image augmentation. For instance, the gesture widget may have a user selection set it associated with a contrast parameter, an exposure parameter, and the like, so that the user may adjustments for those parameters using fewer interactions (e.g., taping a common widget, selecting a UI element, etc.).

In some cases, the user selections of the settings may set, for a widget, text size, position, origin property, color overlay property of the widget. For instance, the user selections may modify these metadata associated with the widget, so that the user may recognize/more easily identify the widget, if the user is low vision.

In some cases, a first widget may be configured as the persistent widget type. The persistent widget may be configured to enable the user to adjust associated first parameters using control operations on control elements. Additionally, a second widget may be configured as a gesture widget type. The second widget may be configured to enable the user to adjust associated second parameters by gesture operations without interaction on the control elements, or activate a defined function.

In some cases, the second widget may be associated with a widget control area (e.g., region 904/906) of the at least one display. The user device 103 may be configured to: determine whether a user interaction is started in or performed entirely within the widget control area. For instance, the user device 103 may determine whether one or both of touch 908 or release 912 were performed within region 904/906. If so (e.g., in response to determine whether gesture parts were performed in region 904/906), the user device 103 may determine whether the user interaction corresponds to a gesture operation of the gesture operations. For instance, the user device 103 may have a conditional trigger mapped to each gesture operation and determines whether the conditional trigger is satisfied (e.g., touch starts in region, proceeds for minimum length, and releases). If so (e.g., in response to determining a conditional trigger is satisfied), the user device 103 may perform an action corresponding to the gesture operation.

In some cases, the gesture operations may include one or combinations of: tap, tap and hold, 1 finger swipe (e.g., for at least a minimum distance), multi-finger swipe (e.g., for a at least minimum distance), pinch (e.g., to within a threshold distance, or traversing a minimum distance), separate (at least a threshold distance apart, or traversing a minimum distance), and/or rotate 2 or more fingers (e.g., a minimum angle of rotation). In some cases, each gesture operation of the gesture operations is mapped to a parameter or defined function.

In some cases, the user device 103 may be configured to: in a case that the gesture operation corresponds to the display widget interaction, display the second widget. The user device 103 may also be configured to display the second widget for a period of time then removed at the end of the period of time, or is displayed until a subsequent gesture operation corresponds to the display widget interaction.

In some cases, the user device 103 may be configured to: in a case that the gesture operation corresponds to parameter adjustment interaction, determine an amount of parameter adjustment based on the gesture operation; and update an associated parameter in accordance with the amount of parameter adjustment. For instance, if the touch 908, swipe 910 for length L, and release 912 satisfies a trigger condition for a parameter adjustment, the user device 103 may adjust that parameter by an amount based on the length L. For instance, the adjustment may be determined absolutely based on the user interface 112, relatively based on near widgets, or absolutely based on a number of pixels traversed (e.g., for each pixel, adjust one integer of parameter). Various mappings between lengths, times, rotations, pauses and the like may map to different degrees of parameter adjustment.

In some cases, the user device 103 may be configured to: in a case that the gesture operation corresponds to activating a defined function, perform the defined function. In some cases, the defined function may be one of the following optional functions: a toggle function to toggle between a camera feed to a freeze frame; an image upload function to access a stored image for image augmentation; a save settings function to save current parameter settings as a first preset file; a save image function to save the augmented set of pixels to the user as a stored image; an apply function to apply a second preset file; a recommendation function to request a machine learning recommendation for a set of parameter settings; a random generator function to generate a random set of parameter settings, or a settings change function to display a settings menu for the second widget or for the user interface. Various defined functions may be different gesture operations, and the like.

In some cases, the plurality of widgets may be positioned on a grid 902 of the user interface. In some cases, the widget control area (e.g., region 904/906) of the gesture widget may be associated with a portion (e.g., region 904/906) of the grid 902 and no other widget control area overlaps the widget control area.

Thus, users with low vision conditions may interact with the application in a manner that enables such users to still see an environment without additional graphical display/obfuscation. Therefore, such low vision users may have increased vision assistance, while also reducing a number of user interactions to make adjustments.

Graphical User Interface Guide

FIGS. 10A-10G depict graphical user interfaces 1000A, 1000B, 1000C, 1000D, 1000E, 1000F, and 1000G for helping a user choose a set of customized augmentation parameters for their needs (e.g., a preference helper system or a walkthrough). The features of FIGS. 10A-10G may be applied to any of FIGS. 1, 2, 3, 4, 5, 6, 7, 8, 9A-9C, and 11. The graphical user interfaces 1000A, 1000B, 1000C, 1000D, 1000E, 1000F, and 1000G may depict an exemplary routine that enables a user to decide on a set of image adjustment and augmentations for a given visual situation.

In some cases, the user device 103 may the graphical user interface 1000A so that the user may make a selection of what environment to obtain an image (or images) for a visual situation to capture through a camera system. Next, the user device 103 may display the graphical user interface 1000B, thereby presenting to the user the image to start the process of inputting variations of a given adjustment. This process may be repeated for every available adjustment or augmentation in order for the user to choose a combination of adjustments to be sent to the adjustment pipeline 111.

In some cases, the user device 103 may the graphical user interface 1000C (e.g., as an example for contrast) may display different adjustments for a parameter in a vertical arrangement. For instance, the image captured may be presented to the user on a display or set of displays with a value of decreased contrast, native contrast, and a value of increased contrast on separate versions of the captured image. For instance, the graphical user interface 1000C may present large scale adjustments that display, e.g., options at ends or near an end of a range, or distributed (e.g., evenly) across a range, of permitted adjustment values. In graphical user interface 1000D, the user may make a selection from the different options presented.

In some cases, the user device 103 may display the graphical user interface 1000E so that the large scale adjustment may be displayed with a small scale adjustment user element. The user may make a small scale adjustment (e.g., within a more limited range of values than in the graphical user interface 1000C, or within a defined range from the large scale adjustment).

In some cases, the user device 103 may display the graphical user interface 1000F to display different adjustments in a horizonal arrangement. For instance, the image captured may be presented to the user on a display or set of displays with a value of different color overlays or exposures. For instance, the graphical user interface 1000F may present large scale adjustments of exposure that display, e.g., options at ends or near an end of a range, or distributed (e.g., evenly) across a range, of permitted adjustment values. In graphical user interface 1000F, the user may make a selection from the different options presented by swiping left or right by viewing the options and indicating a selection.

In some cases, the user device 103 may display multiple adjustment parameters at a same time. For instance, the graphical user interface 1000G may display different color overlays or exposures at the same time to the user. In some cases, the graphical user interface 1000G may also provide for small scale adjustments to those offered in graphical user interface 1000F.

Thus, the user may indicate using the user interface 112 their preferred version of the image. Once a version is chosen an additional user interface component may be presented in order to allow the user to fine tune the extent of contrast added/detracted. This same process may also be used to aid a user in choosing a color overlay, inversion option, or preset file option by displaying to the user several versions of one image with varied adjustment applied. The way in which these options are presented to users may be based on their past usage of various adjustments, their environment or the visual context of the sample image. This functionality may be undertaken to help orient a user to the process of creating presets, visually describe how various adjustment parameters change an image, or to aid users who cannot engage with sliders or toggles.

Following this process the user may choose to save the combination or all or some of the adjustments chosen as a preset file 505.

Computer System

FIG. 11 depicts an example system that may execute techniques presented herein. FIG. 11 is a simplified functional block diagram of a computer that may be configured to execute techniques described herein, according to exemplary cases of the present disclosure. Specifically, the computer (or "platform" as it may not be a single physical computer infrastructure) may include a data communication interface 1160 for packet data communication. The platform may also include a central processing unit ("CPU") 1120, in the form of one or more processors, for executing program instructions. The platform may include an internal communication bus 1110, and the platform may also include a program storage and/or a data storage for various data files to be processed and/or communicated by the platform such as ROM 1130 and RAM 1140, although the system 1100 may receive programming and data via network communications. The system 1100 also may include input and output ports 1150 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Numbered Embodiments

Exemplary embodiments of the systems and methods disclosed herein are described in the numbered paragraphs below.

A1. A system for vision assistance, the system comprising:

at least one memory storing instructions; and at least one processor executing the instructions to perform operations, the operations comprising:

obtaining, from a camera system or a storage system, at least one image of a visual environment or situation, wherein a first image of the at least one image includes a first set of pixels;

implementing, in accordance with an adjustment pipeline, one or more image adjustments to the first set of pixels to obtain an augmented set of pixels, wherein the one or more image adjustments are determined:

(a) through a user interface by user interactions from a user and/or (b) a recommendation of a machine learning model; and presenting, on at least one display, the augmented set of pixels to the user.

A2. The system of A1, wherein the one or more image adjustments includes a color overlay image augmentation.

A3. The system of A2, wherein the color overlay image augmentation enhances viewability of the visual environment or situation for the user.

A4. The system of any of A1-A3, wherein the recommendation of the machine learning model includes a custom set of image adjustment parameters for the user to enhance viewability of the visual environment or situation for the user.

A5. The system of A4, wherein the machine learning model determines the recommendation based on user context data, environmental factors data, and location data.

A6. The system of any of A1-A5, wherein the one or more image adjustments are retrieved from a preset file, the preset file stores the one or more image adjustments as adjustment parameters, and the preset file is configured to allow for quick access to the one or more image adjustments.

A7. The system of any of A1-A6, wherein a method for supervised user creation of parameters of image adjustment using a walkthrough of multiple options for each potentially adjustable parameter.

A8. The system of any of A1-A7, wherein the one or more image adjustments includes an inversion image augmentation, a contrast image augmentation, an exposure image augmentation, and a color overlay image augmentation.

A9. The system of A8, wherein the one or more image adjustments are applied in a defined sequence to the set of pixels, and the defined sequence includes:

applying, if active, the inversion image augmentation;

applying, if active, the contrast image augmentation;

applying, if active, the exposure image augmentation; and applying, if active, the color overlay image augmentation.

A10. The system of A8, wherein the color overlay image augmentation includes a color hue image augmentation and a color lightness image augmentation.

A11. The system of A10, wherein the color hue augmentation is applied before the color lightness augmentation in a defined sequence.

A12. The system of any of A1-A11, wherein obtaining, implementing and presenting happen continuously and in real time on a camera feed of the camera system.

A13. The system of A12, wherein the operations further include:

in response to receiving a user interaction for a zoom operation, instructing the camera system to perform an optical zoom; and obtaining the updated camera feed.

A14. The system of A12, wherein the operations further include:

in response to receiving a user interaction for a pause operation, capturing a last frame from the camera feed; and implementing and presenting on the last frame from the camera feed.

A15. The system of A14, wherein the operations further include:

in response to receiving a user interaction for a zoom operation, digitally zooming on the last frame from the camera feed; and implementing and presenting on the digitally zoomed last frame from the camera feed.

A16. A computer-implemented method for vision assistance, the computer-implemented method comprising:

obtaining, from a camera system or a storage system, at least one image of a visual environment or situation, wherein a first image of the at least one image includes a first set of pixels;

implementing, in accordance with an adjustment pipeline, one or more image adjustments to the first set of pixels to obtain an augmented set of pixels, wherein the one or more image adjustments are determined:

(a) through a user interface by user interactions from a user and/or (b) a recommendation of a machine learning model; and presenting, on at least one display, the augmented set of pixels to the user.

A17. The method of A16, wherein the one or more image adjustments includes an inversion image augmentation, a contrast image augmentation, an exposure image augmentation, and a color overlay image augmentation.

A18. The method of A16, wherein the one or more image adjustments are applied in a defined sequence to the set of pixels, and the defined sequence includes:

applying, if active, an inversion image augmentation;

applying, if active, an contrast image augmentation;

applying, if active, an exposure image augmentation; and applying, if active, a color overlay image augmentation.

A19. The method of A16, wherein obtaining, implementing and presenting happen continuously and in real time on a camera feed of the camera system.

A20. A non-transitory computer readable medium comprising instructions that, when executed by at least one processor, cause the at least one processor to perform a method comprising:

obtaining, from a camera system or a storage system, at least one image of a visual environment or situation, wherein a first image of the at least one image includes a first set of pixels;

implementing, in accordance with an adjustment pipeline, one or more image adjustments to the first set of pixels to obtain an augmented set of pixels, wherein the one or more image adjustments are determined:

(a) through a user interface by user interactions from a user and/or (b) a recommendation of a machine learning model; and presenting, on at least one display, the augmented set of pixels to the user.

B1. A system for vision assistance, the system comprising:

at least one memory storing instructions; and at least one processor executing the instructions to perform operations, the operations comprising:

obtaining, from a camera system, at least one image of a visual environment or situation, wherein a first image of the at least one image includes a first set of pixels;

implementing, in accordance with an adjustment layer, one or more image adjustments to the first set of pixels to obtain an augmented set of pixels, wherein the adjustment layer is determined through a user interface by user interactions from a user, the one or more image adjustments include an inversion image augmentation, a contrast image augmentation, an exposure image augmentation, and a color overlay image augmentation, the user interface includes a plurality of widgets to adjust parameters associated with the inversion image augmentation, the contrast image augmentation, the exposure image augmentation, and the color overlay image augmentation, each of the plurality of widgets are a persistent widget type or a gesture widget type; and presenting, on at least one display, the augmented set of pixels to the user, wherein any widgets that are the persistent widget type are displayed overlayed on the augmented set of pixels, and any widgets that are the gesture widget type are not displayed overlayed on the augmented set of pixels except in response to a display widget interaction.

B2. The system of B1, wherein the user interface is configured to be customized by user selections of settings.

B3. The system of B2, wherein the user selections of the settings sets a widget as the persistent widget type or the gesture widget type.

B4. The system of B2, wherein the user selections of the settings sets a widget to control specific parameters associated with one or combinations of the inversion image augmentation, the contrast image augmentation, the exposure image augmentation, and the color overlay image augmentation.

B5. The system of B2, wherein the user selections of the settings sets, for a widget, text size, position, origin property, color overlay property of the widget.

B6. The system of any of B1-B5, wherein a first widget configured as the persistent widget type is configured to enable the user to adjust associated first parameters using control operations on control elements, and a second widget configured as the gesture widget type is configured to enable the user to adjust associated second parameters by gesture operations without interaction on the control elements, or activate a defined function.

B7. The system of B6, wherein the second widget is associated with a widget control area of the at least one display, and operations further include:

determining whether a user interaction is started in or performed entirely within the widget control area;

if so, determining whether the user interaction corresponds to a gesture operation of the gesture operations; and if so, performing an action corresponding to the gesture operation.

B8. The system of B6, wherein the gesture operations include one or combinations of: tap, tap and hold, 1 finger swipe, multi-finger swipe, pinch, separate, and/or rotate 2 or more fingers.

B9. The system of B6, wherein each gesture operation of the gesture operations is mapped to a parameter or defined function.

B10. The system of B6, wherein, in a case that the gesture operation corresponds to the display widget interaction, the operations further include: displaying the second widget.

B11. The system of B10, wherein the second widget is displayed for a period of time then removed at the end of the period of time, or is displayed until a subsequent gesture operation corresponds to the display widget interaction.

B12. The system of B6, wherein, in a case that the gesture operation corresponds to parameter adjustment interaction, the operations further include: determining an amount of parameter adjustment based on the gesture operation; and updating an associated parameter in accordance with the amount of parameter adjustment.

B13. The system of B6, wherein, in a case that the gesture operation corresponds to activating a defined function, the operations further include: performing the defined function, and the defined function is:

a toggle function to toggle between a camera feed to a freeze frame, an image upload function to access a stored image for image augmentation, a save settings function to save current parameter settings as a first preset file, a save image function to save the augmented set of pixels to the user as a stored image, an apply function to apply a second preset file, a recommendation function to request a machine learning recommendation for a set of parameter settings, a random generator function to generate a random set of parameter settings, or a settings change function to display a settings menu for the second widget or for the user interface.

B14. The system of B6, wherein the plurality of widgets are positioned on a grid of the user interface.

B15. The system of B14, wherein the widget control area is associated with a portion of the grid and no other widget control area overlaps the widget control area.

B16. A computer-implemented method for vision assistance, the computer-implemented method comprising:

obtaining, from a camera system, at least one image of a visual environment or situation, wherein a first image of the at least one image includes a first set of pixels;

implementing, in accordance with an adjustment layer, one or more image adjustments to the first set of pixels to obtain an augmented set of pixels, wherein the adjustment layer is determined through a user interface by user interactions from a user, the one or more image adjustments include an inversion image augmentation, a contrast image augmentation, an exposure image augmentation, and a color overlay image augmentation, the user interface includes a plurality of widgets to adjust parameters associated with the inversion image augmentation, the contrast image augmentation, the exposure image augmentation, and the color overlay image augmentation, each of the plurality of widgets are a persistent widget type or a gesture widget type; and presenting, on at least one display, the augmented set of pixels to the user, wherein any widgets that are the persistent widget type are displayed overlayed on the augmented set of pixels, and

24 any widgets that are the gesture widget type are not displayed overlayed on the augmented set of pixels except in response to a display widget interaction.

B17. The method of A16, wherein a first widget configured as the persistent widget type is configured to enable the user to adjust associated first parameters using control operations on control elements, and a second widget configured as the gesture widget type is configured to enable the user to adjust associated second parameters by gesture operations without interaction on the control elements, or activate a defined function.

B18. The method of A17, wherein the second widget is associated with a widget control area of the at least one display, and operations further include:

determining whether a user interaction is started in or performed entirely within the widget control area;

if so, determining whether the user interaction corresponds to a gesture operation of the gesture operations; and if so, performing an action corresponding to the gesture operation.

B19. The method of A17, wherein each gesture operation of the gesture operations is mapped to a parameter or defined function;

in a case that the gesture operation corresponds to the display widget interaction, the operations further include: displaying the second widget;

in a case that the gesture operation corresponds to parameter adjustment interaction, the operations further include: determining an amount of parameter adjustment based on the gesture operation; and updating an associated parameter in accordance with the amount of parameter adjustment;

in a case that the gesture operation corresponds to activating a defined function, the operations further include: performing the defined function, and the defined function is:

a toggle function to toggle between a camera feed to a freeze frame, an image upload function to access a stored image for image augmentation, a save settings function to save current parameter settings as a first preset file, a save image function to save the augmented set of pixels to the user as a stored image, an apply function to apply a second preset file, a recommendation function to request a machine learning recommendation for a set of parameter settings, a random generator function to generate a random set of parameter settings, or a settings change function to display a settings menu for the second widget or for the user interface.

B20. A non-transitory computer readable medium comprising instructions that, when executed by at least one processor, cause the at least one processor to perform a method comprising:

obtaining, from a camera system, at least one image of a visual environment or situation, wherein a first image of the at least one image includes a first set of pixels;

implementing, in accordance with an adjustment layer, one or more image adjustments to the first set of pixels to obtain an augmented set of pixels, wherein the adjustment layer is determined through a user interface by user interactions from a user, the one or more image adjustments include an inversion image augmentation, a contrast image augmentation, an exposure image augmentation, and a color overlay image augmentation, the user interface includes a plurality of widgets to adjust parameters associated with the inversion image augmentation, the contrast image augmentation, the exposure image augmentation, and the color overlay image augmentation, each of the plurality of widgets are a persistent widget type or a gesture widget type; and presenting, on at least one display, the augmented set of pixels to the user, wherein any widgets that are the persistent widget type are displayed overlayed on the augmented set of pixels, and any widgets that are the gesture widget type are not displayed overlayed on the augmented set of pixels except in response to a display widget interaction.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for vision assistance, the system comprising:

at least one memory configured to store instructions; and at least one processor executing the instructions to perform operations, the operations comprising:

obtaining, from a camera system or a storage system, at least one image of a visual environment or situation, wherein a first image of the at least one image includes a first set of pixels;

implementing, in accordance with an adjustment pipeline, a plurality of image adjustments to the first set of pixels to obtain an augmented set of pixels, wherein the plurality of image adjustments are determined:

(a) through a user interface by user interactions from a vision impaired user and/or (b) a recommendation of a machine learning model, wherein the recommendation includes a custom set of image adjustment parameters for the vision impaired user to enhance viewability of the visual environment or situation for the vision impaired user; and presenting, on at least one display, the augmented set of pixels to the vision impaired user, wherein the plurality of image adjustments are applied in an ordered sequence of an inversion layer, then a contrast layer, then an exposure layer, then a color hue of a color overlay, and then a color lightness of the color overlay.

2. The system of claim 1, wherein the plurality of image adjustments includes a color overlay image augmentation.

3. The system of claim 2, wherein the color overlay image augmentation enhances viewability of the visual environment or situation for the vision impaired user.

4. The system of claim 1, wherein the machine learning model determines the recommendation based on user context data, environmental factors data, and location data.

5. The system of claim 1, wherein the plurality of image adjustments are retrieved from a preset file, the preset file stores the plurality of image adjustments as adjustment parameters, and the preset file is configured to allow for quick access to the plurality of image adjustments.

6. The system of claim 1, wherein a method for supervised user creation of parameters of image adjustment using a walkthrough of multiple options for each potentially adjustable parameter.

7. The system of claim 1, wherein obtaining, implementing and presenting happen continuously and in real time on a camera feed of the camera system.

8. The system of claim 7, wherein the operations further include:

in response to receiving a user interaction for a zoom operation, instructing the camera system to perform an optical zoom; and obtaining an updated camera feed.

9. The system of claim 7, wherein the operations further include:

in response to receiving a user interaction for a pause operation, capturing a last frame from the camera feed; and implementing and presenting on the last frame from the camera feed.

10. The system of claim 9, wherein the operations further include:

in response to receiving a user interaction for a zoom operation, digitally zooming on the last frame from the camera feed; and implementing and presenting on the last frame as digitally zoomed from the camera feed.

11. A computer-implemented method for vision assistance, the computer-implemented method comprising:

obtaining, from a camera system or a storage system, at least one image of a visual environment or situation, wherein a first image of the at least one image includes a first set of pixels;

implementing, in accordance with an adjustment pipeline, a plurality of image adjustments to the first set of pixels to obtain an augmented set of pixels, wherein the plurality of image adjustments are determined:

(a) through a user interface by user interactions from a vision impaired user and/or (b) a recommendation of a machine learning model, wherein the recommendation includes a custom set of image adjustment parameters for the vision impaired user to enhance viewability of the visual environment or situation for the vision impaired user; and presenting, on at least one display, the augmented set of pixels to the vision impaired user, wherein the plurality of image adjustments are applied in an ordered sequence of an inversion layer, then a contrast layer, then an exposure layer, then a color hue of a color overlay, and then a color lightness of the color overlay.

12. The computer-implemented method of claim 11, wherein obtaining, implementing and presenting happen continuously and in real time on a camera feed of the camera system.

13. A non-transitory computer readable medium comprising instructions that, when executed by at least one processor, cause the at least one processor to perform a method comprising:

obtaining, from a camera system or a storage system, at least one image of a visual environment or situation, wherein a first image of the at least one image includes a first set of pixels;

implementing, in accordance with an adjustment pipeline, a plurality of image adjustments to the first set of pixels to obtain an augmented set of pixels, wherein the plurality of image adjustments are determined:

(a) through a user interface by user interactions from a vision impaired user and/or (b) a recommendation of a machine learning model, wherein the recommendation includes a custom set of image adjustment parameters for the vision impaired user to enhance viewability of the visual environment or situation for the vision impaired user; and presenting, on at least one display, the augmented set of pixels to the vision impaired user, wherein the plurality of image adjustments are applied in an ordered sequence of an inversion layer, then a contrast layer, then an exposure layer, then a color hue of a color overlay, and then a color lightness of the color overlay.

*    *    *    *    *